US009409429B2

(12) United States Patent
Koshida

(10) Patent No.: US 9,409,429 B2
(45) Date of Patent: Aug. 9, 2016

(54) BELT UNIT, IMAGE FORMING APPARATUS AND BELT MEMBER EXCHANGING METHOD

(71) Applicant: CANON KABUSHIKI KAISHA, Tokyo (JP)

(72) Inventor: Kohei Koshida, Toride (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 210 days.

(21) Appl. No.: 14/138,365

(22) Filed: Dec. 23, 2013

(65) Prior Publication Data

US 2014/0174888 A1 Jun. 26, 2014

(30) Foreign Application Priority Data

Dec. 25, 2012 (JP) ................................. 2012-281067

(51) Int. Cl.
*B65G 21/00* (2006.01)
*B41J 29/17* (2006.01)
*G03G 15/00* (2006.01)

(52) U.S. Cl.
CPC *B41J 29/17* (2013.01); *G03G 15/00* (2013.01)

(58) Field of Classification Search
CPC .................................................... G03G 15/167
USPC ................... 198/860.1, 861.1, 813, 494, 497; 399/113, 116, 302, 121, 117
See application file for complete search history.

(56) References Cited

U.S. PATENT DOCUMENTS 5,630,194 A * 5/1997 Fujita .................. G03G 15/167 399/121
2009/0110435 A1 4/2009 Spence et al.
2010/0329738 A1 12/2010 Shirai

FOREIGN PATENT DOCUMENTS

JP 2001-337577 A 12/2001
JP 2004-029308 A 1/2004
JP 2004-144877 A 5/2004
JP 2010-204250 A 9/2010
JP 2011-013305 A 1/2011

OTHER PUBLICATIONS

U.S. Appl. No. 14/138,423, filed Dec. 23, 2013, Kohei Koshida.
Chinese Office Action dated Sep. 6, 2015, in related Chinese Patent Application No. 201310726162.9 (with English translation).

* cited by examiner

*Primary Examiner* — Gene Crawford
*Assistant Examiner* — Lester Rushin
(74) *Attorney, Agent, or Firm* — Fitzpatrick, Cella, Harper & Scinto

(57) ABSTRACT

A belt unit for use with an image forming apparatus includes a belt member, a belt supporting unit, and a cleaning unit. The cleaning unit includes attached portions engaged with attaching portions of the belt supporting unit to mount the cleaning unit in an attached position, a connecting portion connectable with a connected portion on the belt supporting unit, and a contact portion that contacts a horizontal surface when the cleaning unit is placed on the horizontal surface. When the belt supporting unit is in a standing state in which one of its side units is directed downward and a direction of rotation axis of supporting rollers is directed in a vertical direction, the cleaning unit is placed on the horizontal surface and the connected portion, and the connecting portion are connected, the cleaning unit maintains the belt supporting unit in the standing state.

10 Claims, 24 Drawing Sheets

(a)

(b)

BELT UNIT, IMAGE FORMING APPARATUS AND BELT MEMBER EXCHANGING METHOD

FIELD OF THE INVENTION AND RELATED ART

The present invention relates to a belt unit of an image forming apparatus, the image forming apparatus and a belt member exchanging method.

In Japanese Laid-Open Patent Application (JP-A) 2011-13305, a so-called tandem type image forming apparatus in which toner images independently formed at a plurality of image forming portions are superposed by being transferred onto a recording material by using a belt member (intermediary transfer belt or recording material conveying belt) has been widely used. In the image forming apparatus using the belt member, a belt rotating unit in which the belt member is stretched by a plurality of rotatable supporting members supported by a pair of side members is provided so as to be pullable out from a casing of the image forming apparatus.

In JP-A 2010-204250, an image forming apparatus in which a belt unit prepared by integrally assembling such a belt rotating unit with a cleaning unit for cleaning a belt member is provided so as to be pullable out from a casing of the image forming apparatus is shown.

With respect to the belt rotating unit, a durable lifetime of the belt member is short compared with the pair of side members, the rotatable side members and other mechanism parts (components), and therefore the belt rotating unit is required to be reused again and again by exchanging only the belt member. In that case, if the belt rotating unit can be kept in a standing state such that one of the side members is landed (put down) and the other side member is directed upward, the belt member can be pulled out toward above along the rotatable side members, so that operativity is good.

However, the belt rotating unit has an outer appearance in a thin plate-like shape as a whole, and therefore there is no self-standing property in a standing state, so that the belt rotating unit is liable to fall in a front-rear direction with respect to a thickness direction thereof. For that reason, there is no other choice but to support the belt rotating unit in the standing state by an operator and to pull out the belt member, by another operator, from the rotatable belt members supported in the standing state, so that an operating cost corresponding to the two operators was entailed. Further, during an exchanging operation of the belt member, the belt rotating unit fallen or inclined to contact surrounding members, so that there was also a possibility that an exchanged belt member was damaged.

Therefore, preparation of a dedicated jig (tool), for holding the belt rotating unit in the standing state during the operation of the belt member, in the casing of the image forming apparatus was proposed. However, in the image forming apparatuses in recent years, there are no preparation cost and storing space of the dedicated jig which is seldom used.

SUMMARY OF THE INVENTION

According to an aspect of the present invention, there is provided a belt unit comprising: a belt member; a belt supporting unit including a plurality of supporting rollers for supporting the belt member, and a pair of side units for supporting end portions of each of the plurality of supporting rollers; and a cleaning unit, including a cleaning blade for cleaning the belt member, detachably mountable to the belt supporting unit, wherein the cleaning unit includes a connecting portion connectable to one of the side units so that the belt supporting unit from which the cleaning unit is demounted is placed in a standing state such that the one of the side units is directed downward and the other side unit is directed upward.

These and other objects, features and advantages of the present invention will become more apparent upon a consideration of the following description of the preferred embodiments of the present invention taken in conjunction with the accompanying drawings.

Figure 2:
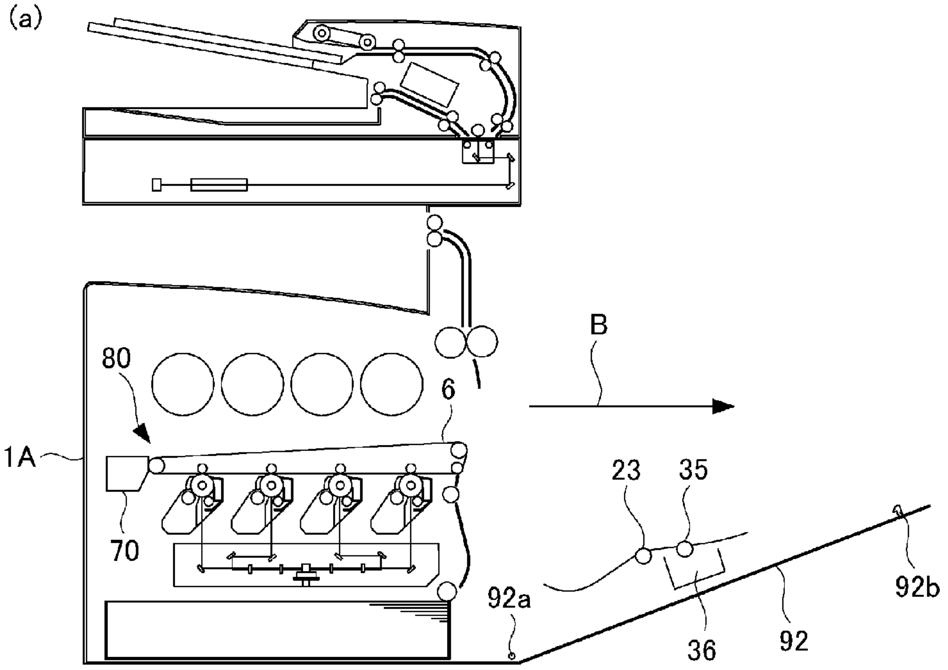
Figure 2:
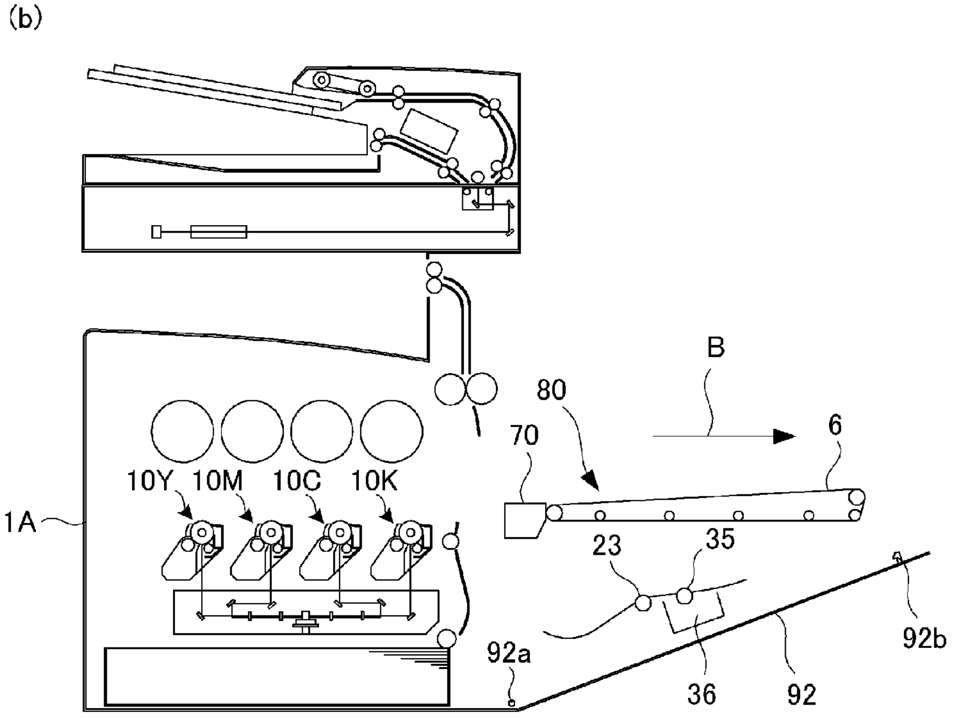

Parts (a) and (b) of FIG. 2 are schematic views for illustrating mounting and demounting of an intermediary transfer unit with respect to the image forming apparatus.

Figure 3:
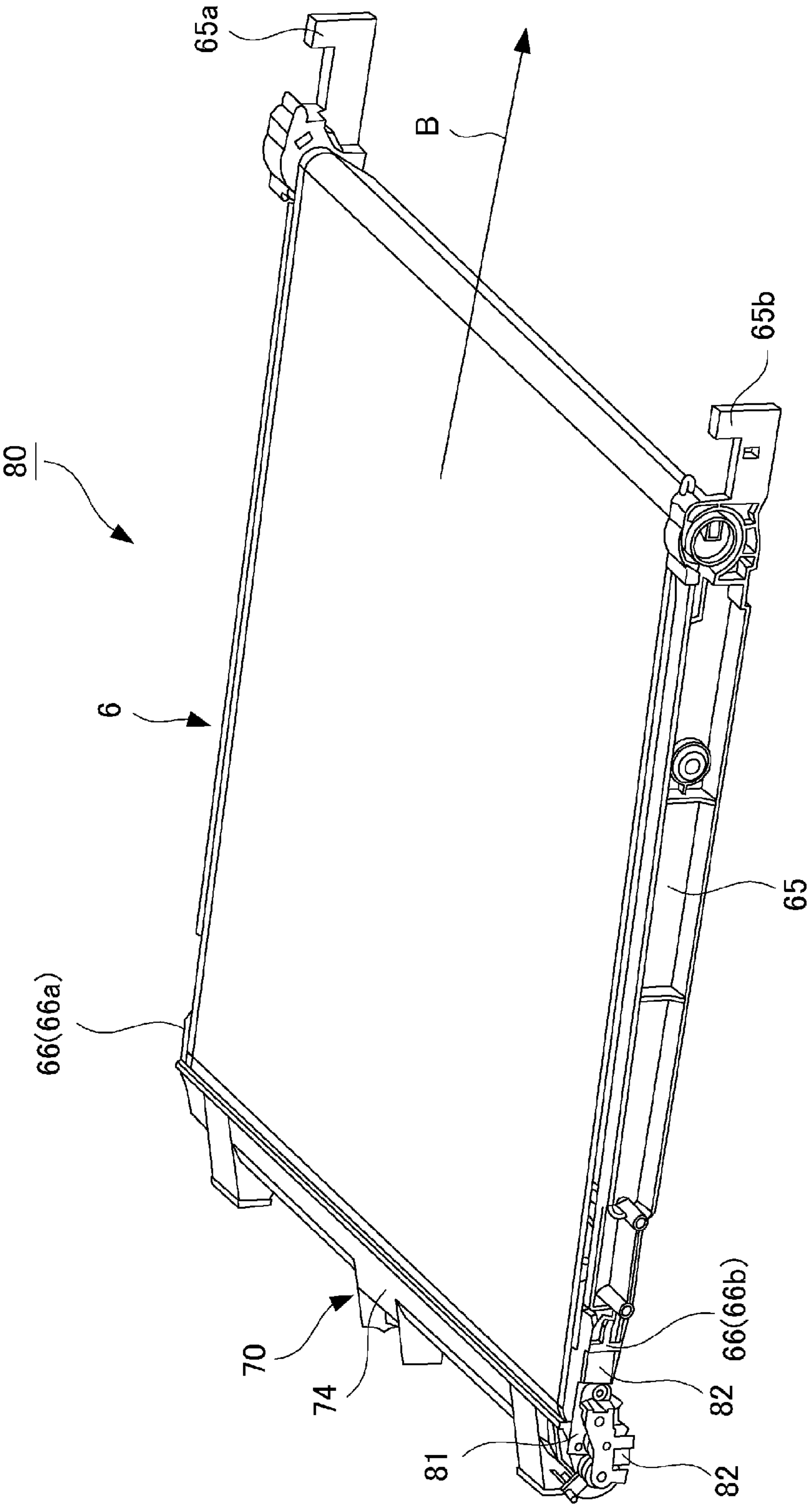

FIG. 3 is an illustration of a structure of the intermediary transfer unit.

Figure 4:
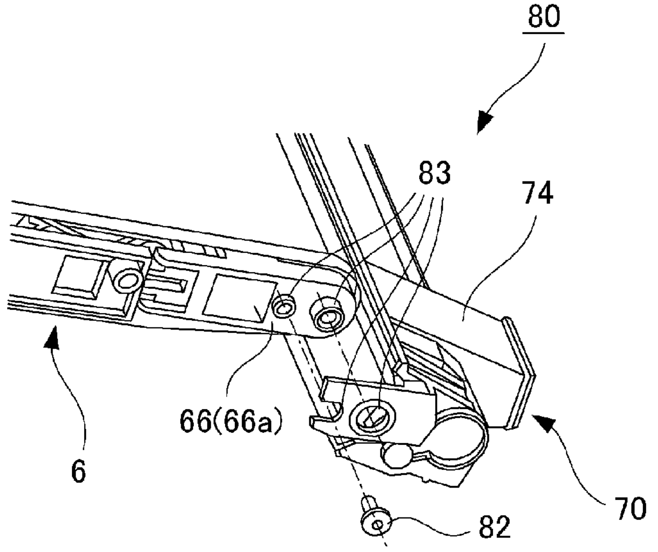
Figure 4:
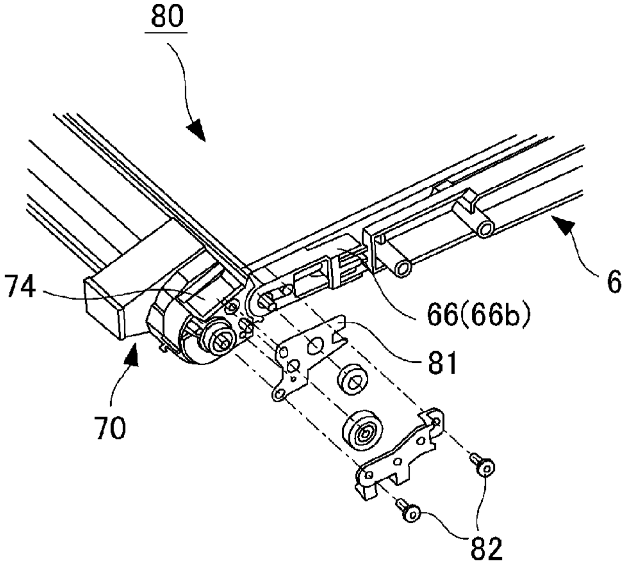

Parts (a) and (b) of FIG. 4 are illustrations of connection between a belt rotating unit and a cleaning unit.

Figure 5:
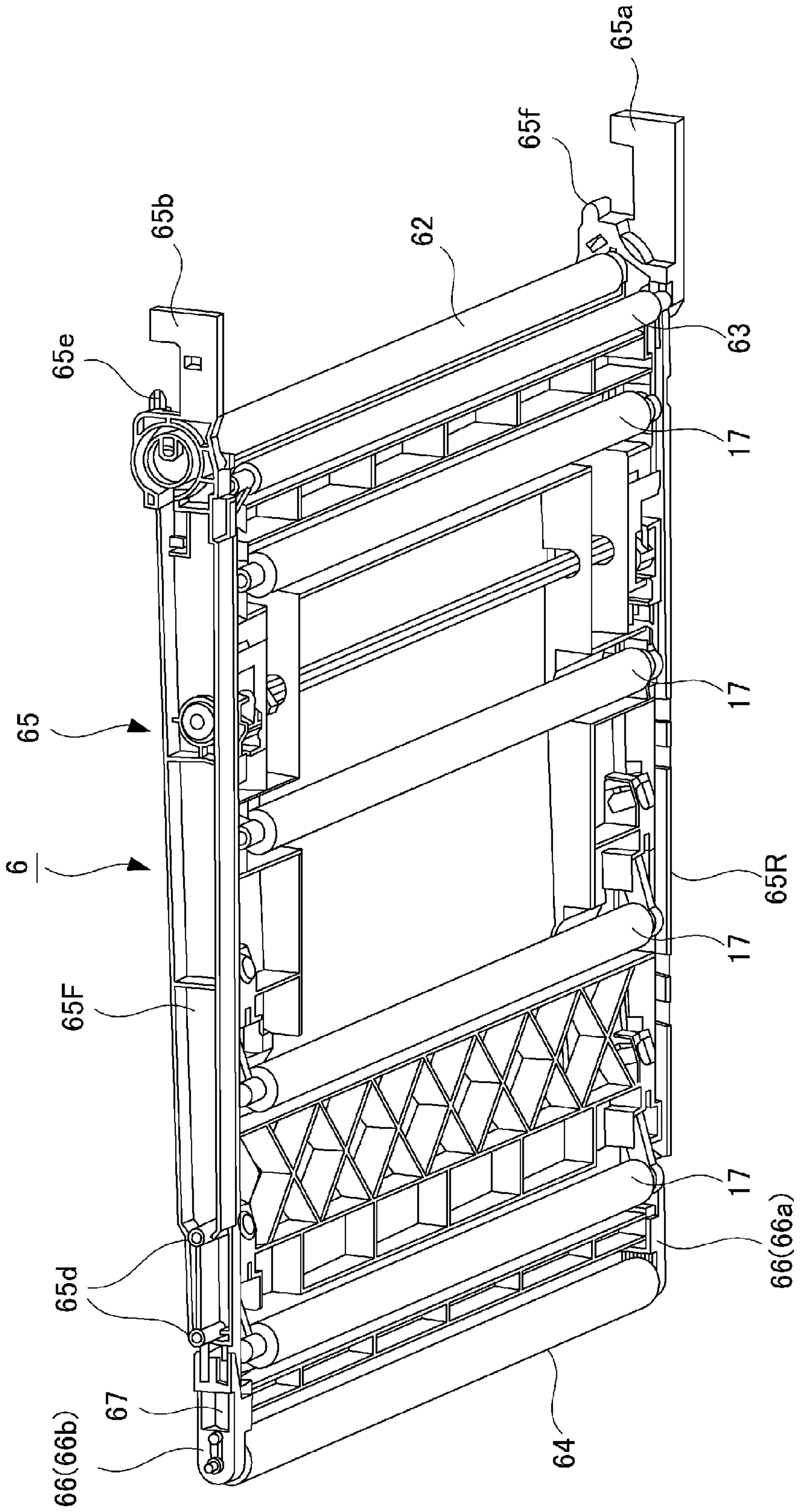

FIG. 5 is a perspective view of the belt rotating unit in a state in which an intermediary transfer belt 61 is removed.

Figure 6:
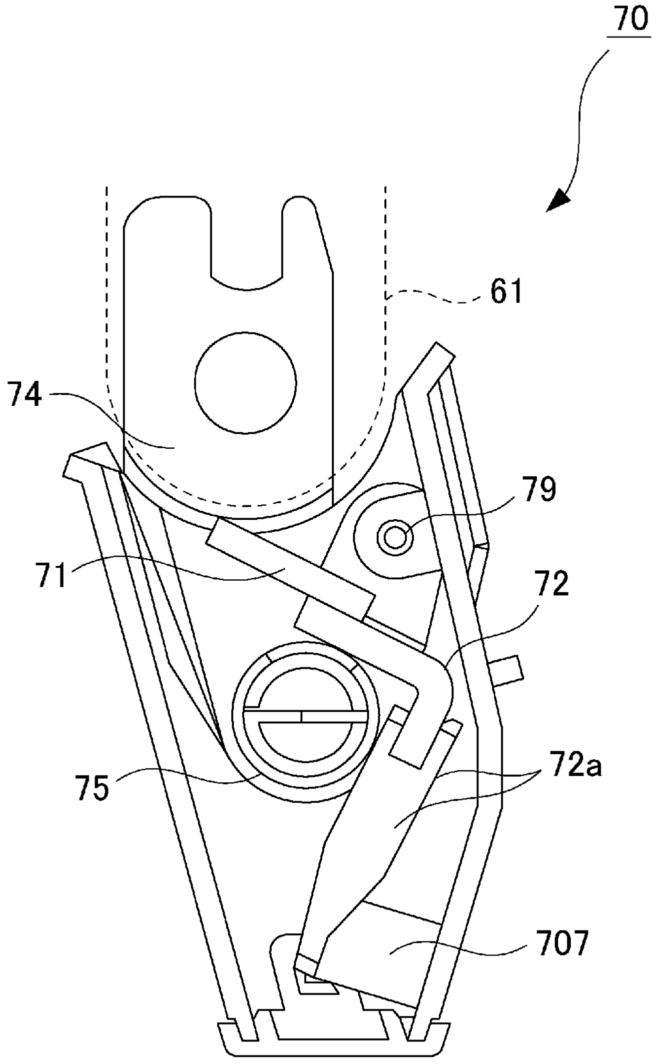

FIG. 6 is an illustration of a cross-sectional structure of the cleaning unit.

Figure 7:
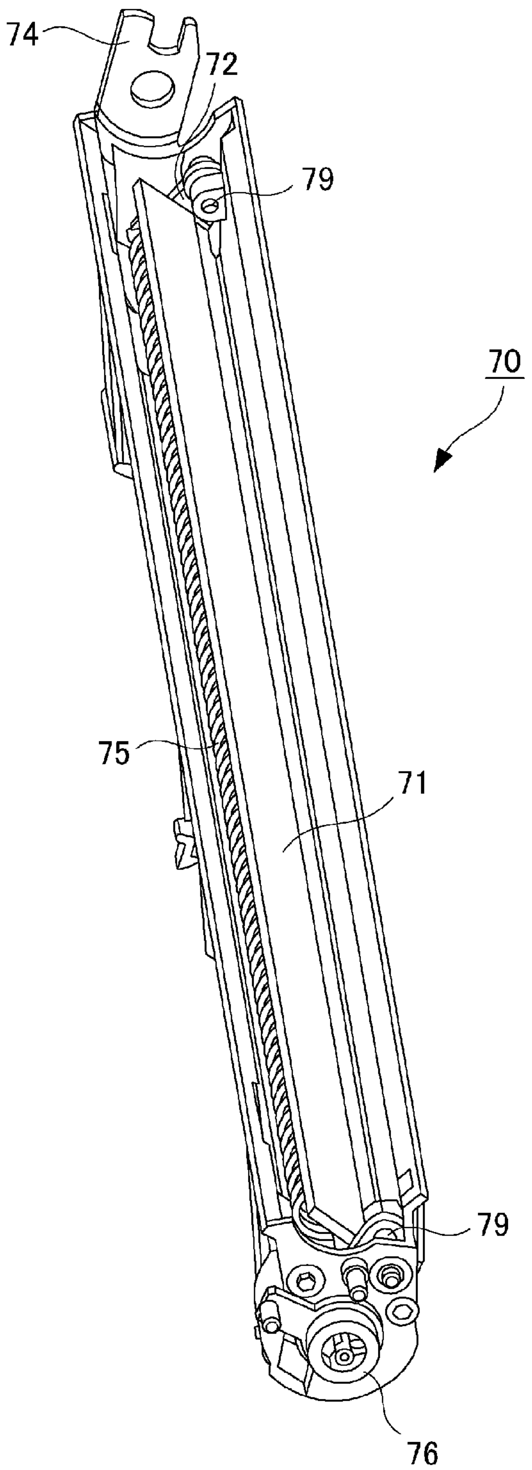

FIG. 7 is a perspective view of the cleaning unit as seen from above.

Figure 8:
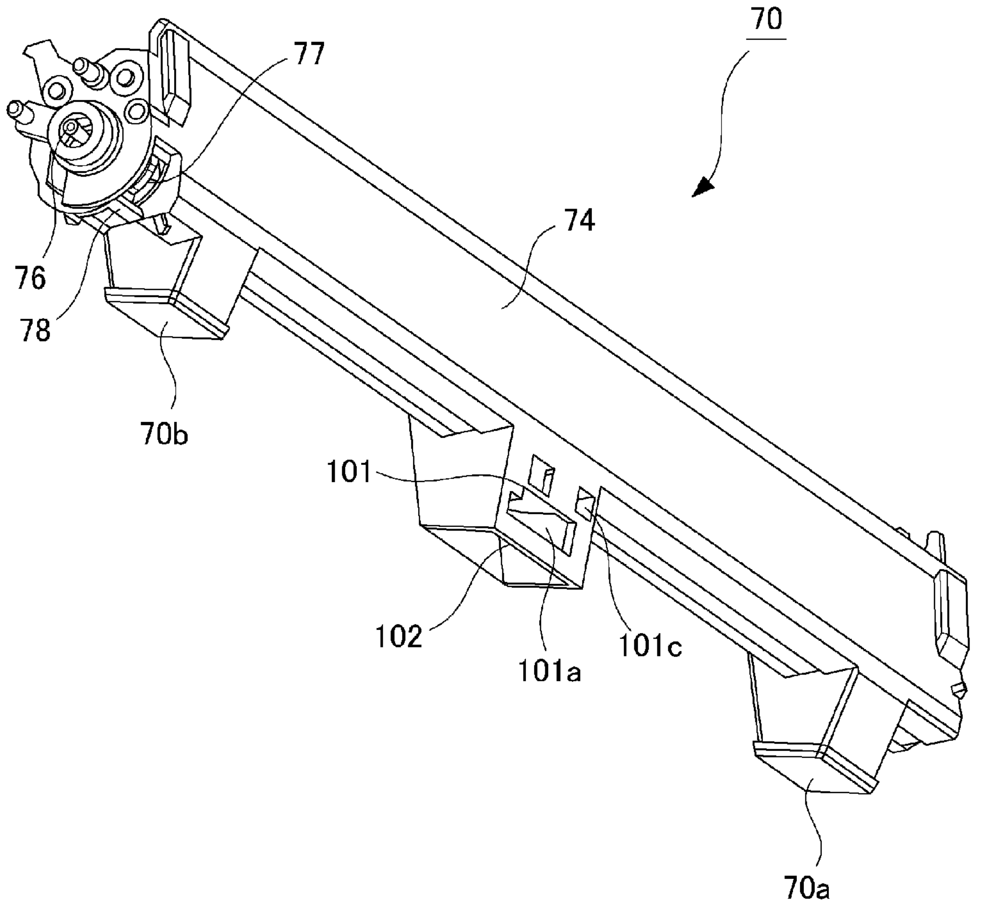

FIG. 8 is a perspective view of the cleaning unit as seen from below.

Figure 9:
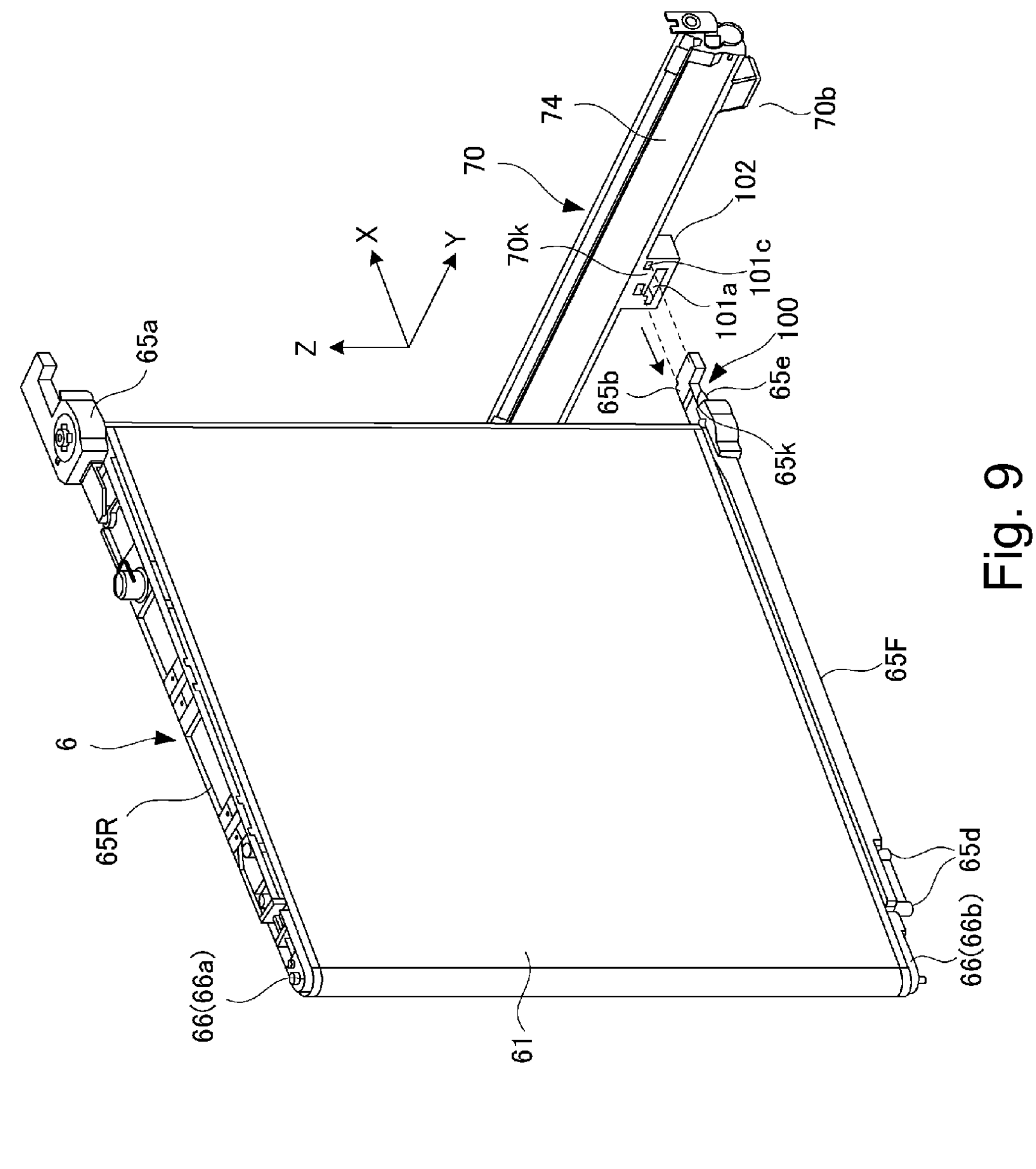

FIG. 9 is a perspective view of the belt rotating unit and the cleaning unit before the connection.

Figure 10:
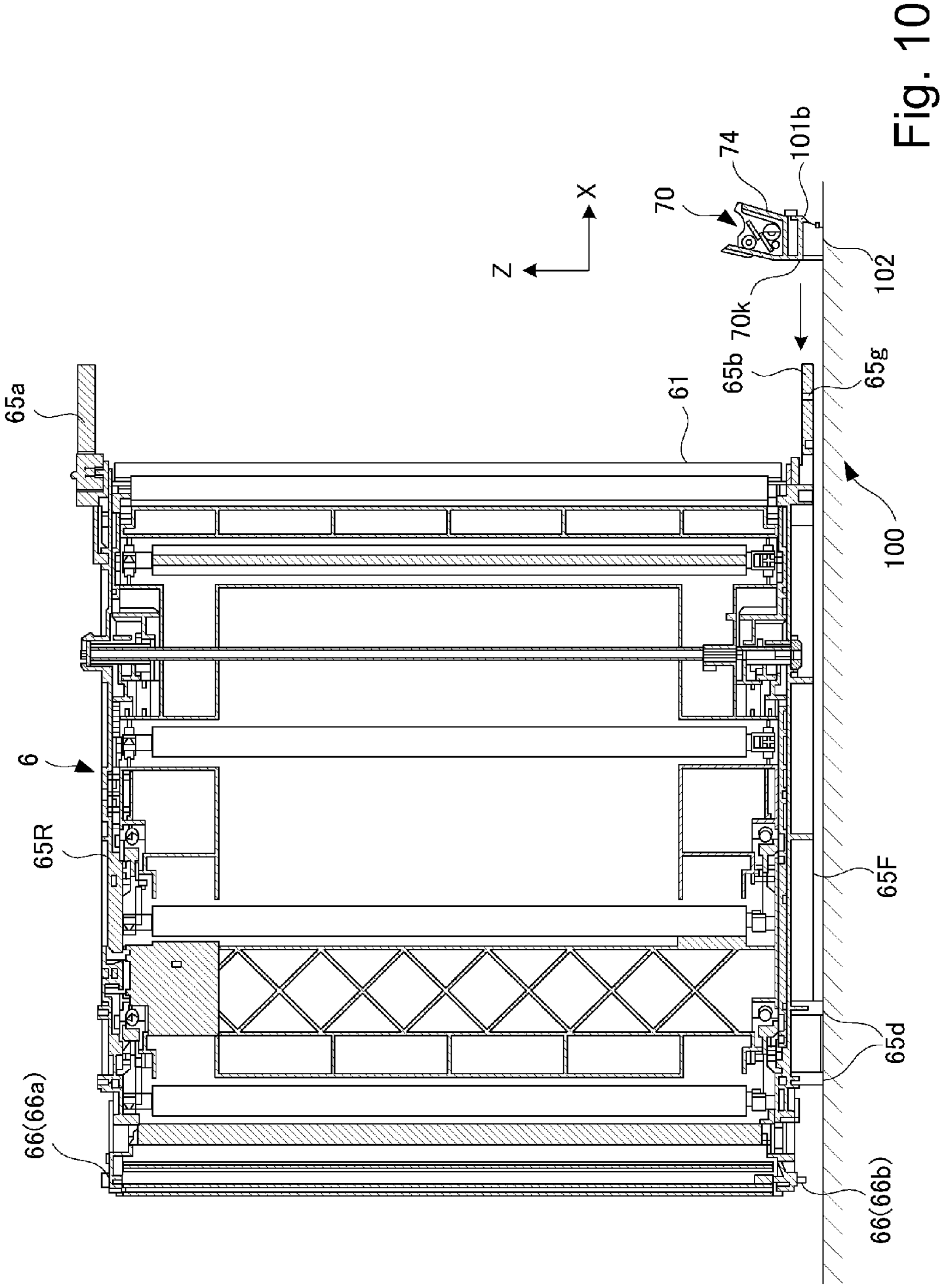

FIG. 10 is a side view of the belt rotating unit and the cleaning unit before the connection.

Figure 11:
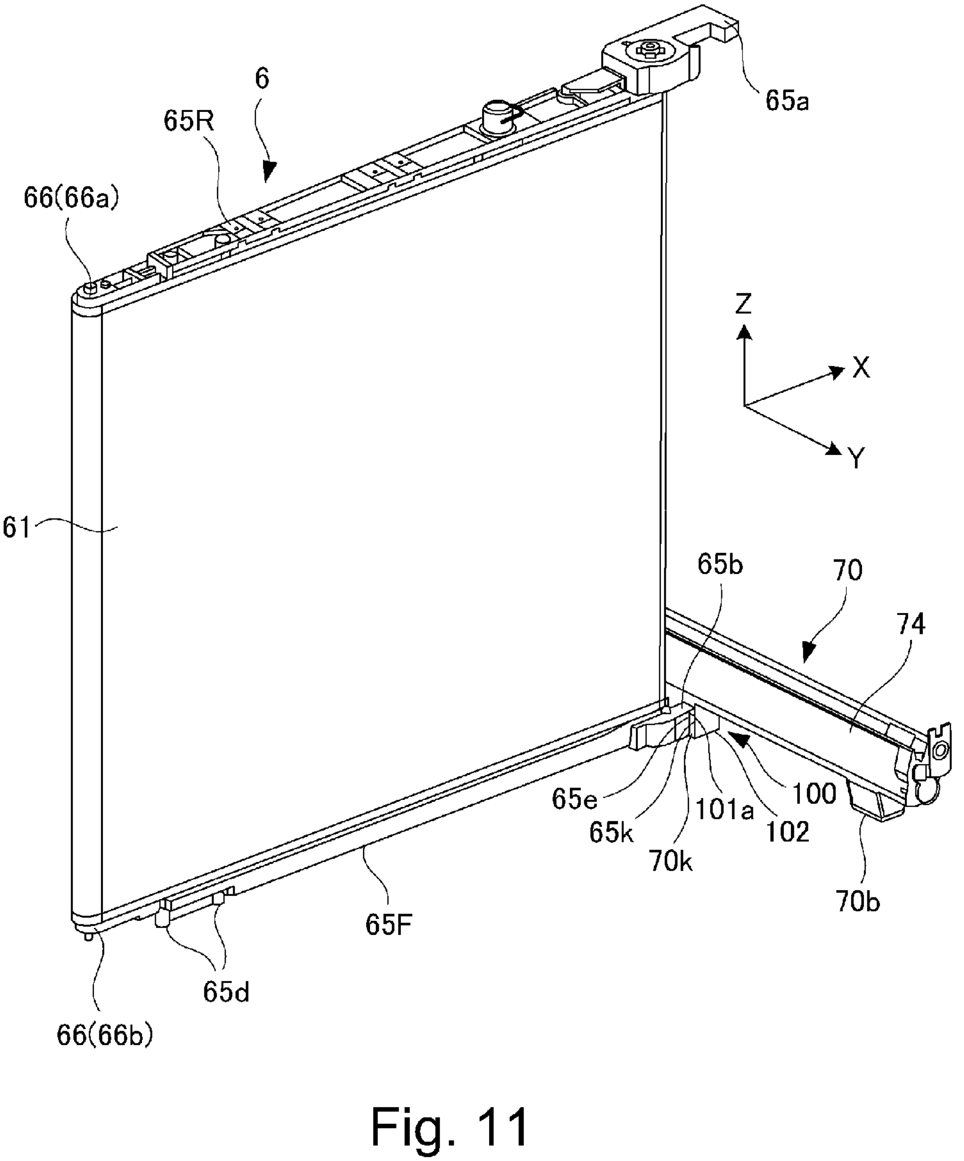

FIG. 11 is a perspective view of the belt rotating unit and the cleaning unit after the connection.

Figure 12:
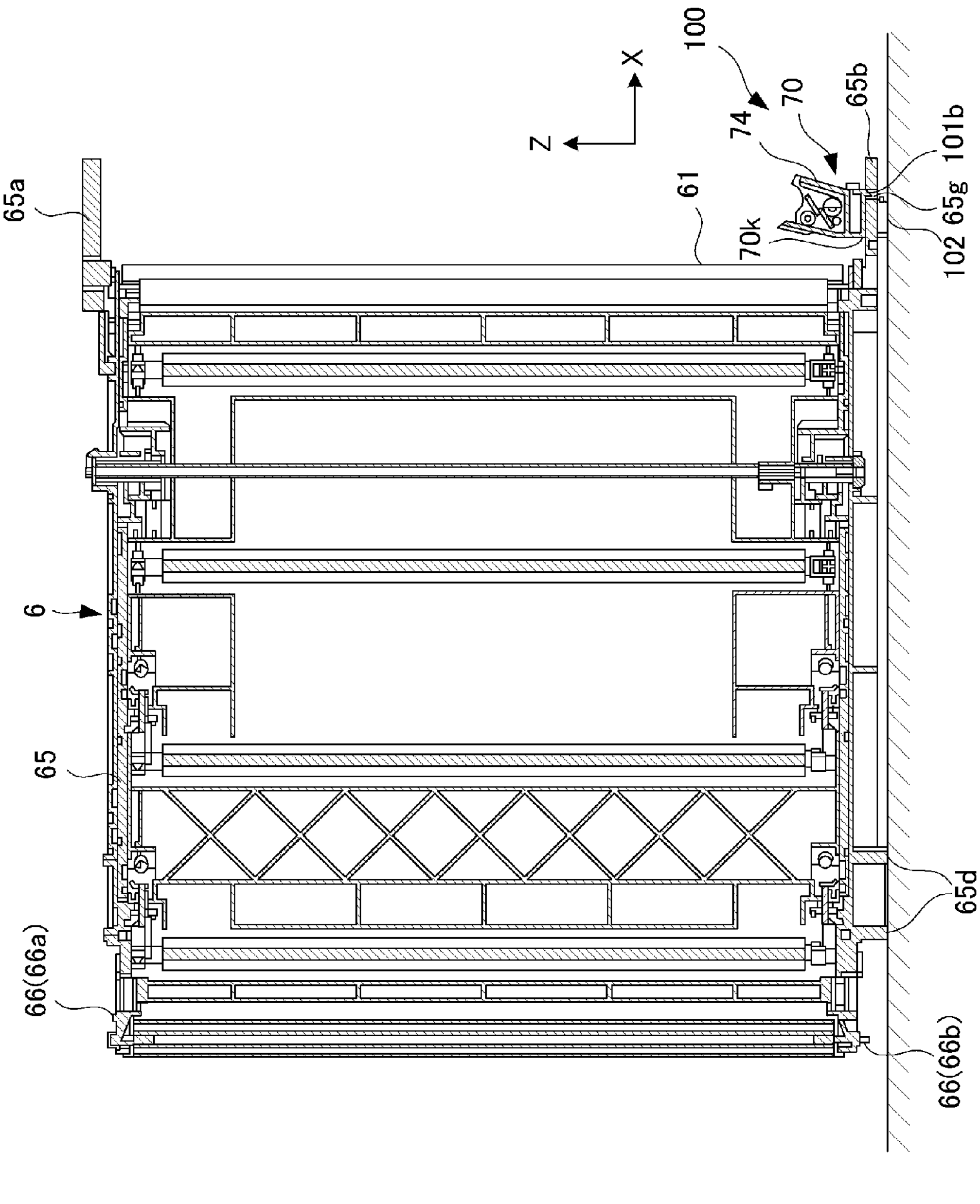

FIG. 12 is a side view of the belt rotating unit and the cleaning unit after the connection.

Figure 13:
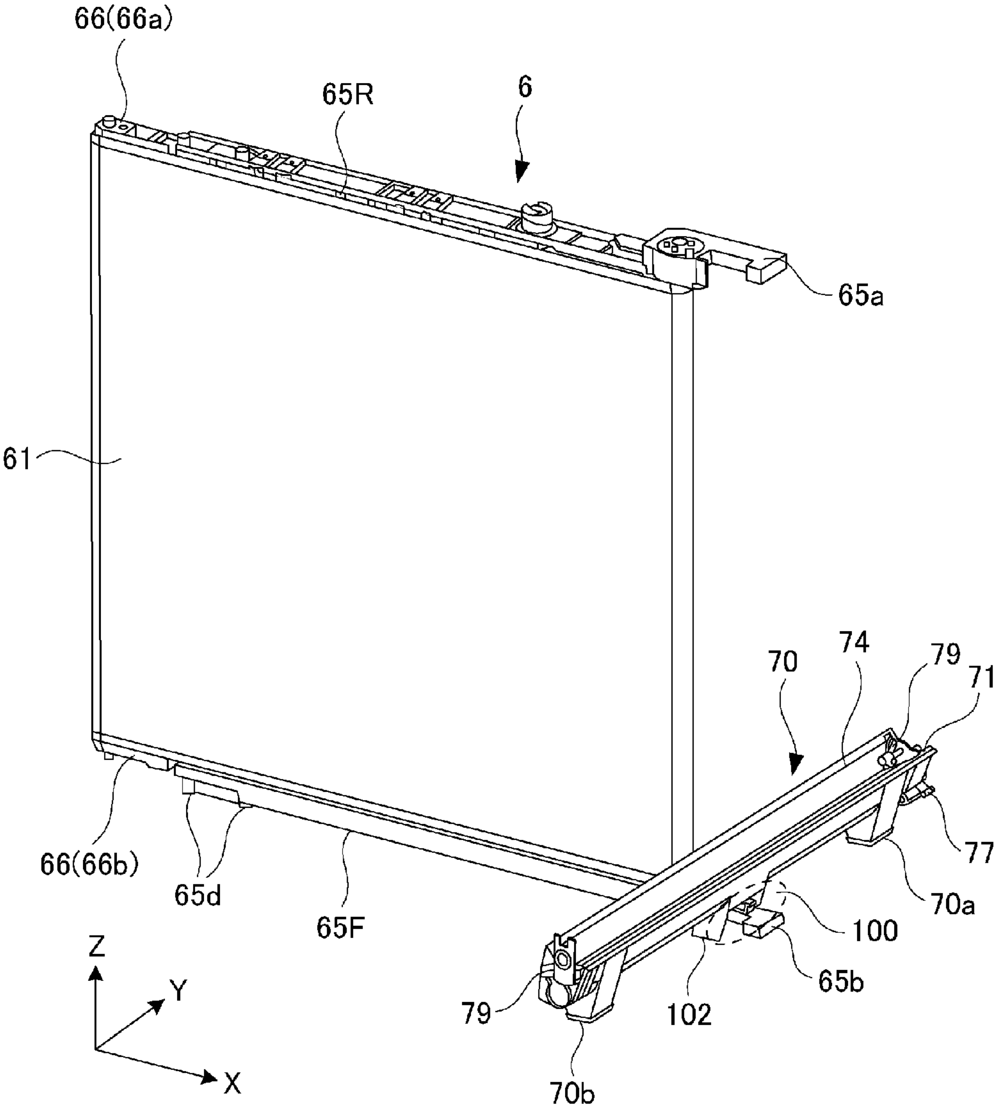

FIG. 13 is a perspective view of the belt rotating unit and the cleaning unit after the connection as seen at a different angle.

Figure 14:
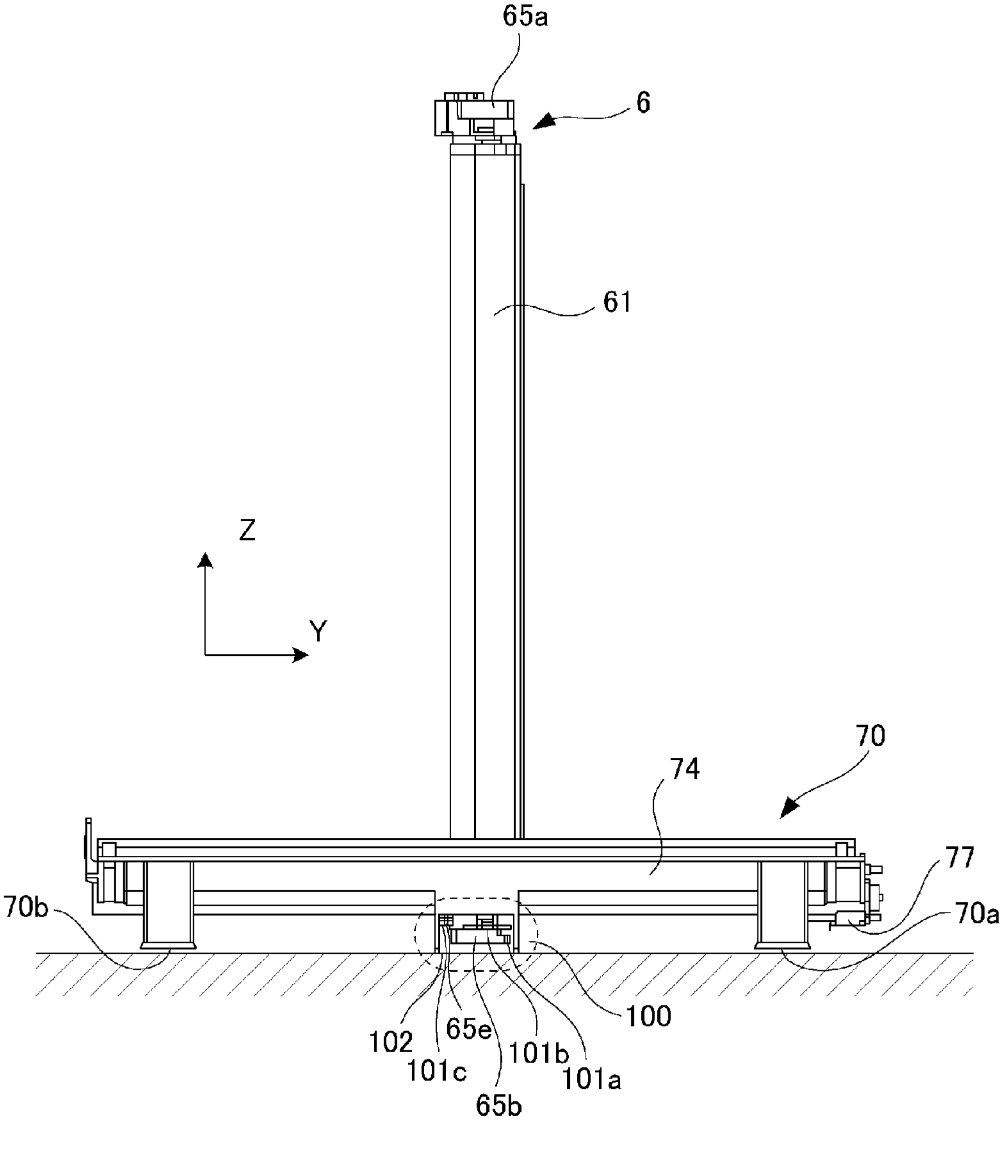

FIG. 14 is a front view of the belt rotating unit and the cleaning unit after the connection.

Figure 15:
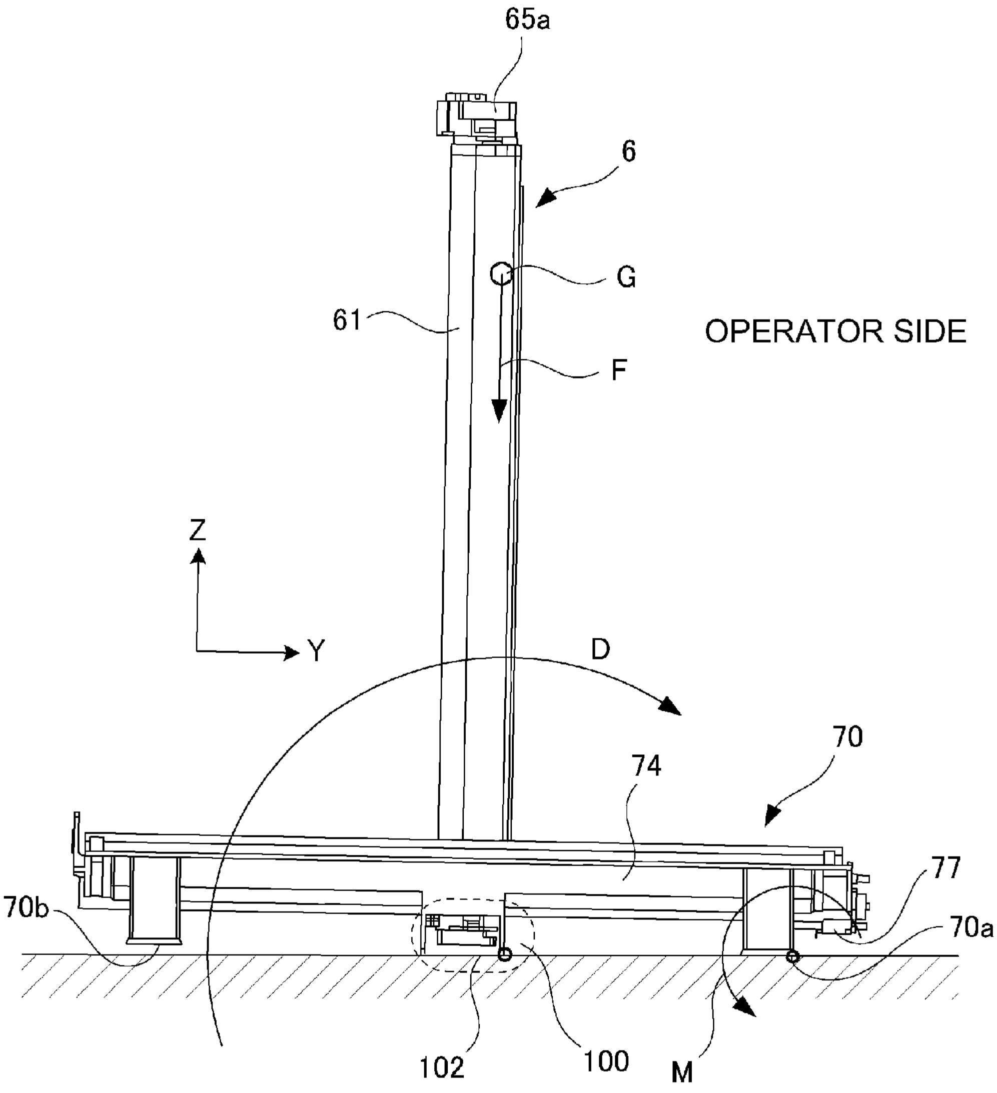

FIG. 15 is an illustration of a tilt angle of the belt rotating unit.

Figure 16:
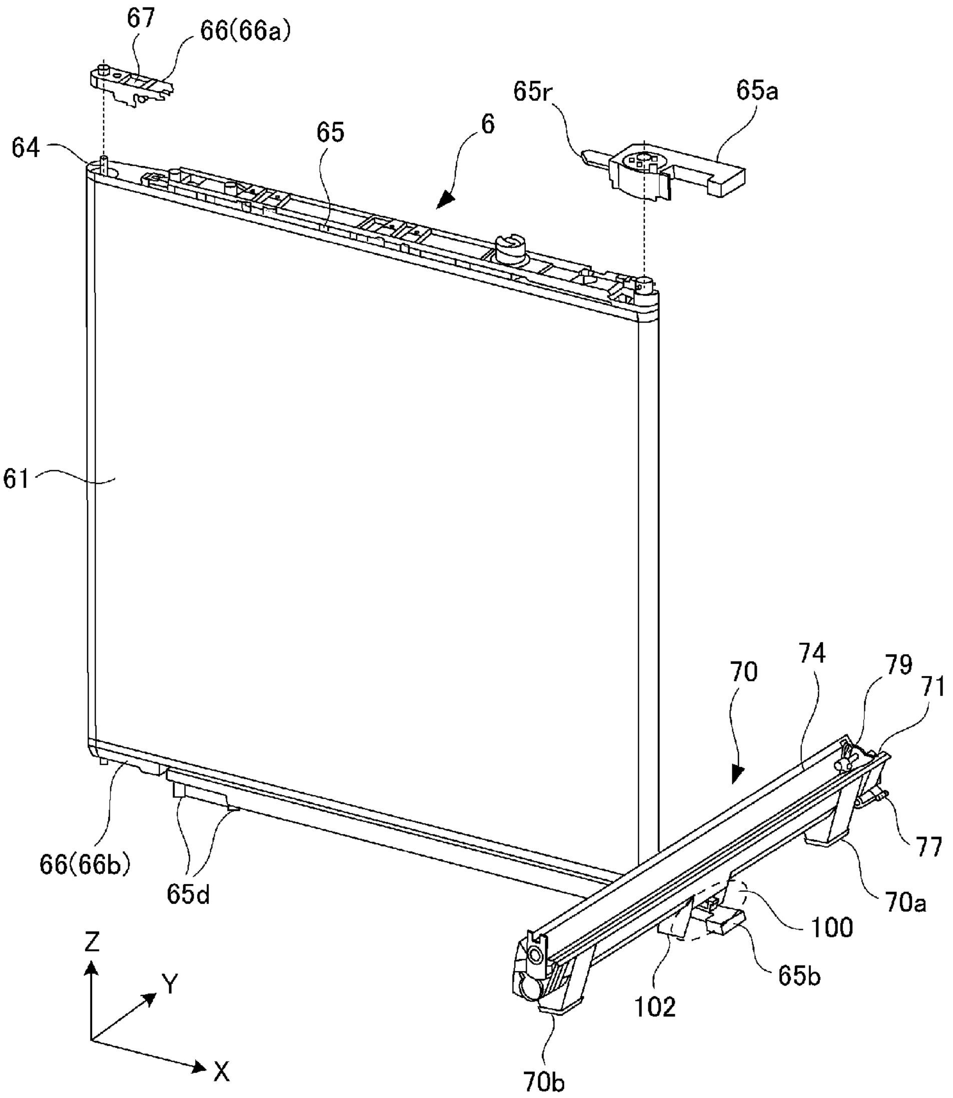

FIG. 16 is a perspective view of the belt rotating unit and the cleaning unit during exchange of the intermediary transfer belt.

Figure 17:
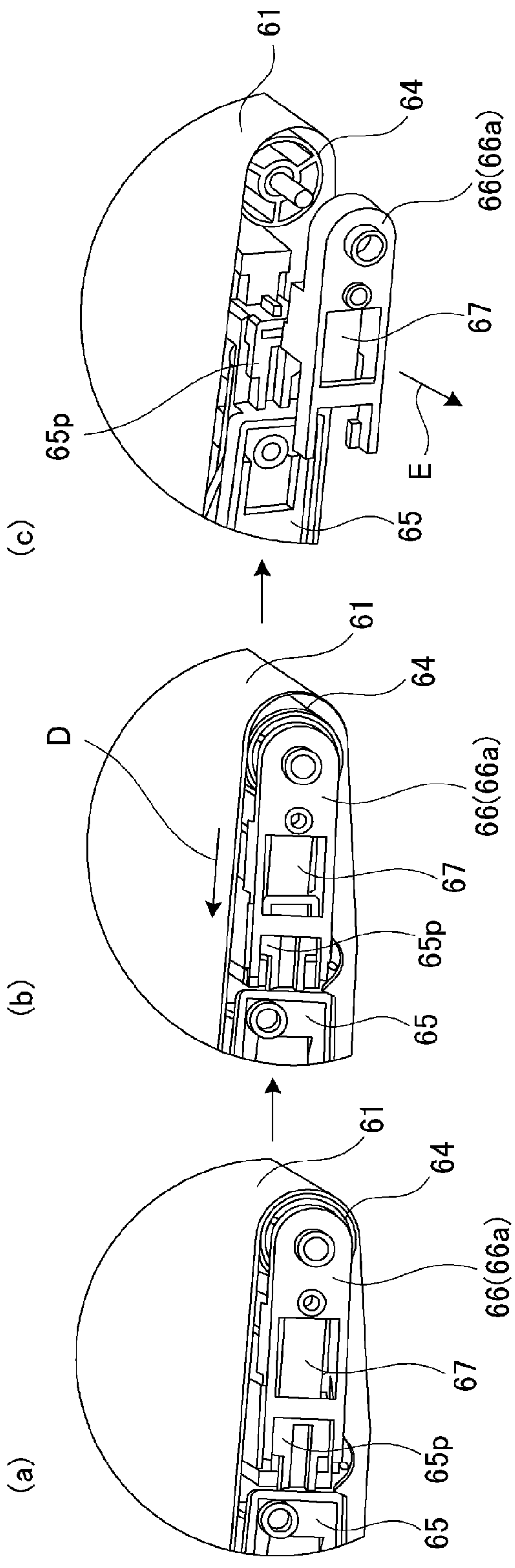

Parts (a), (b) and (c) of FIG. 17 are illustrations of demounting of a tension roller bearing.

Figure 18:
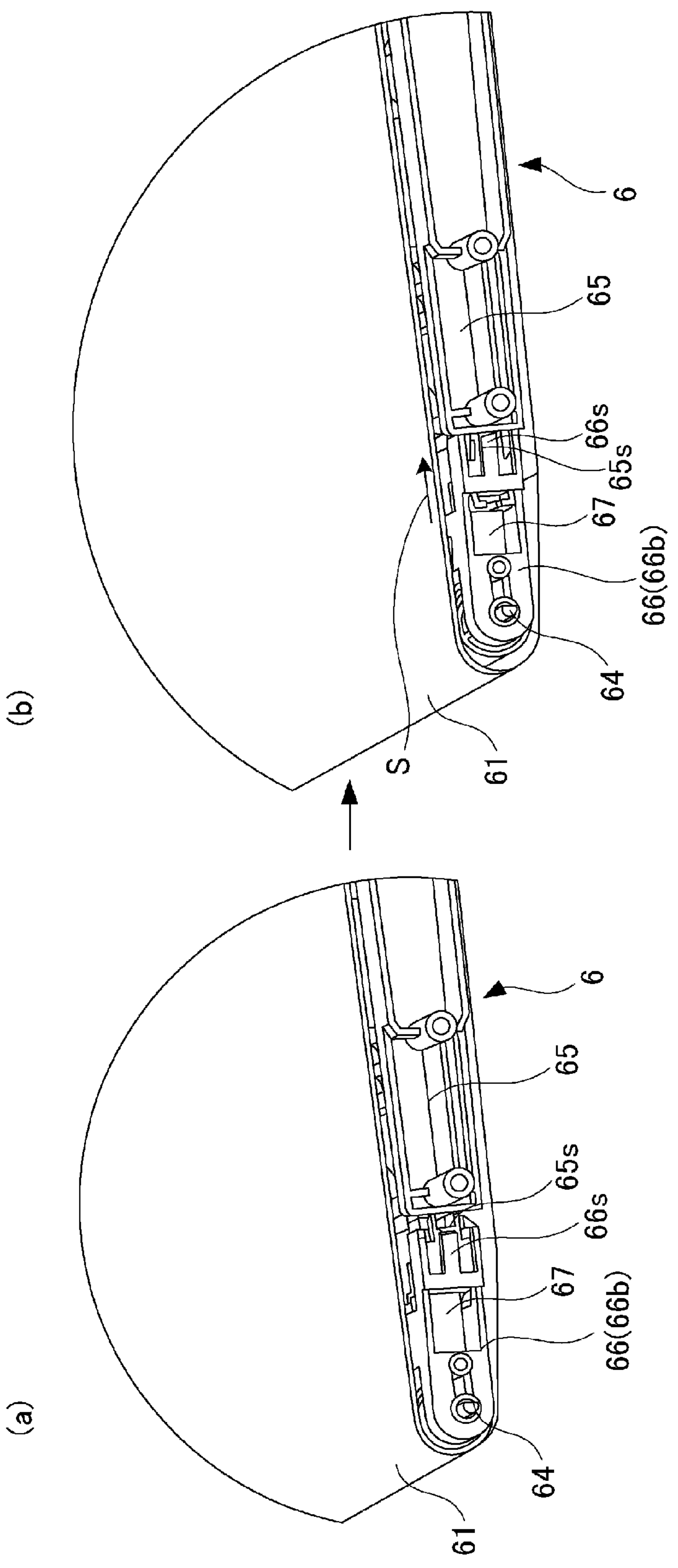

Parts (a) and (b) of FIG. 18 are illustrations of a tension releasing operation of a tension roller.

Figure 19:
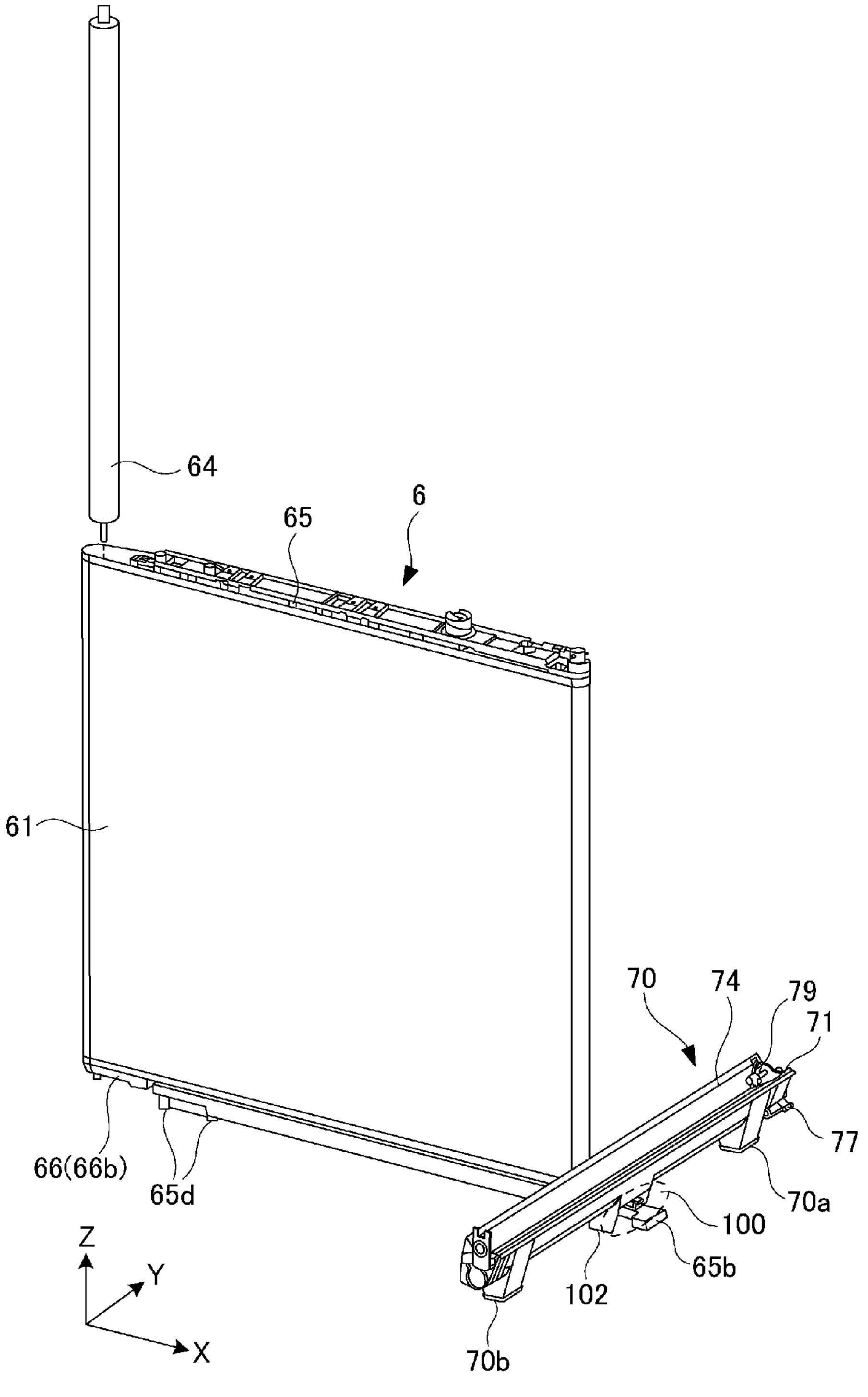

FIG. 19 is an illustration of a tension roller demounting position.

Figure 20:
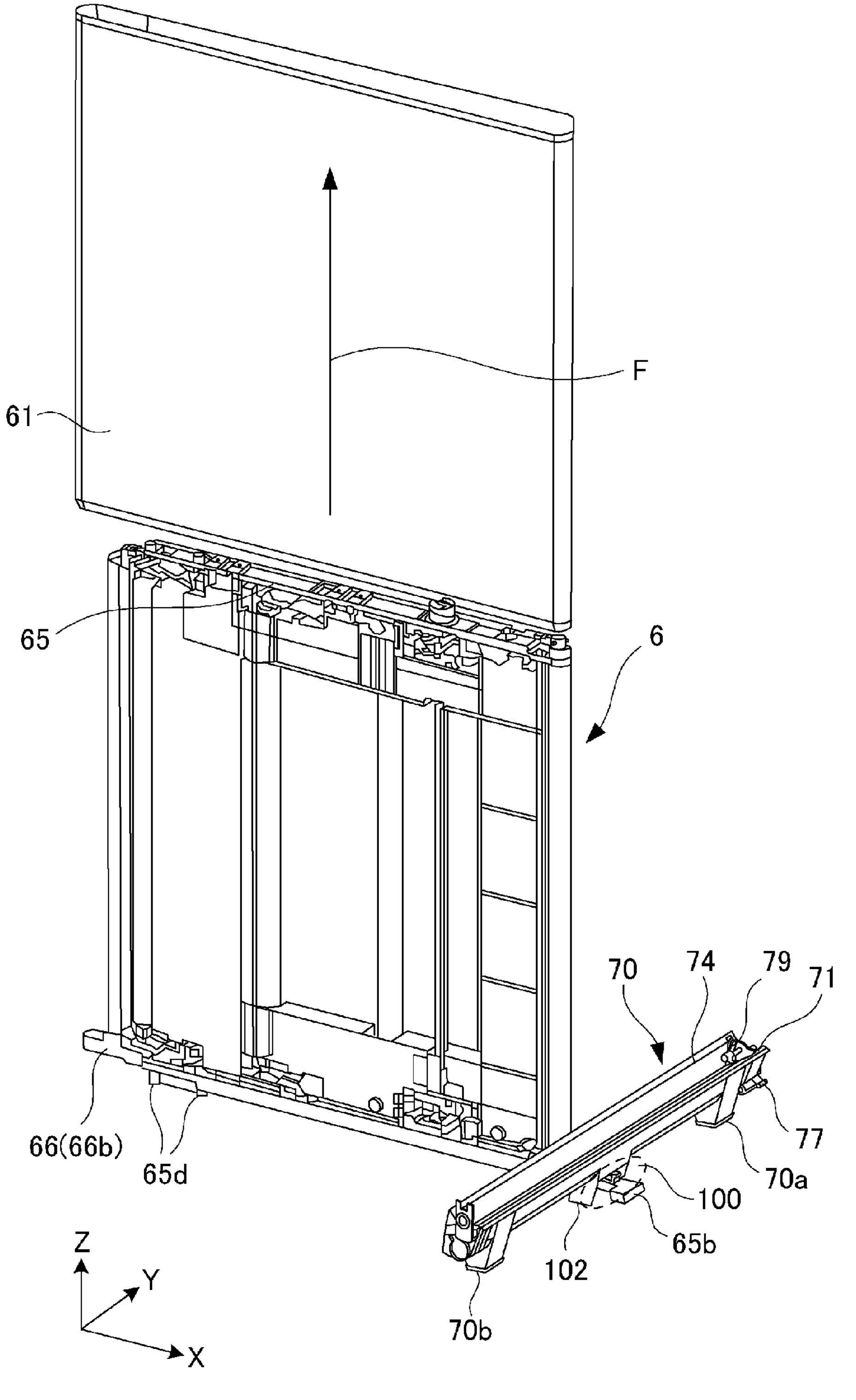

FIG. 20 is an illustration of a pulling-out operation of the intermediary transfer belt.

Figure 21:
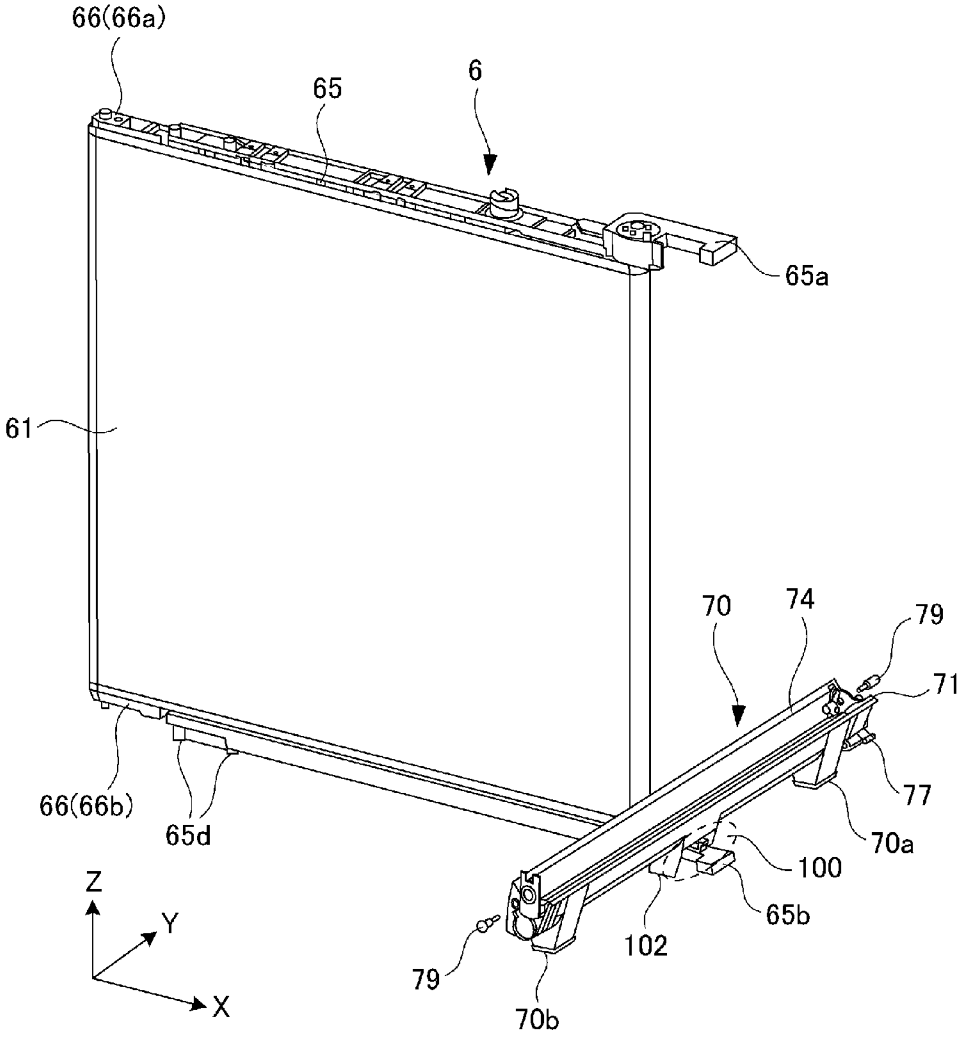

FIG. 21 is an illustration of a disconnecting operation of a cleaning blade.

Figure 22:
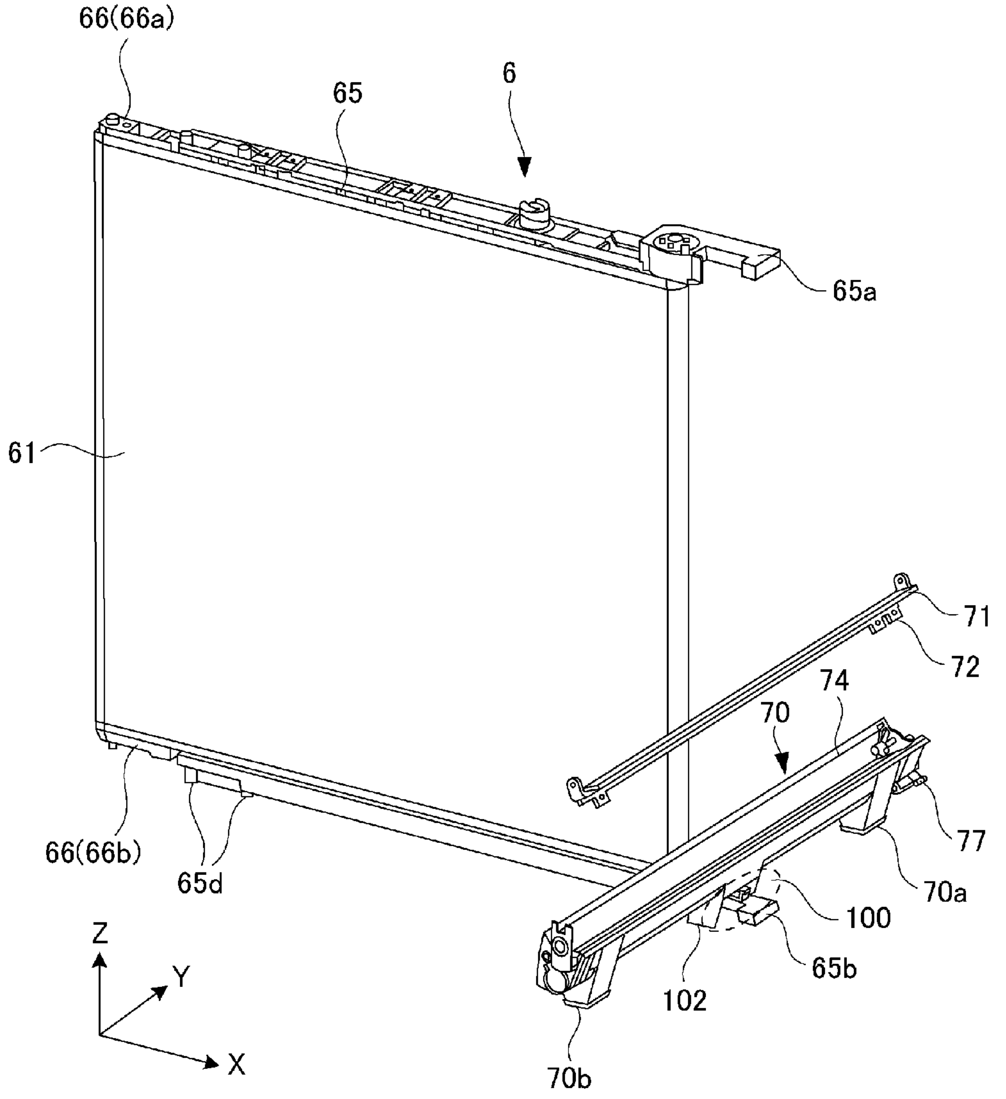

FIG. 22 is an illustration of a demounting operation of the cleaning blade.

Figure 23:
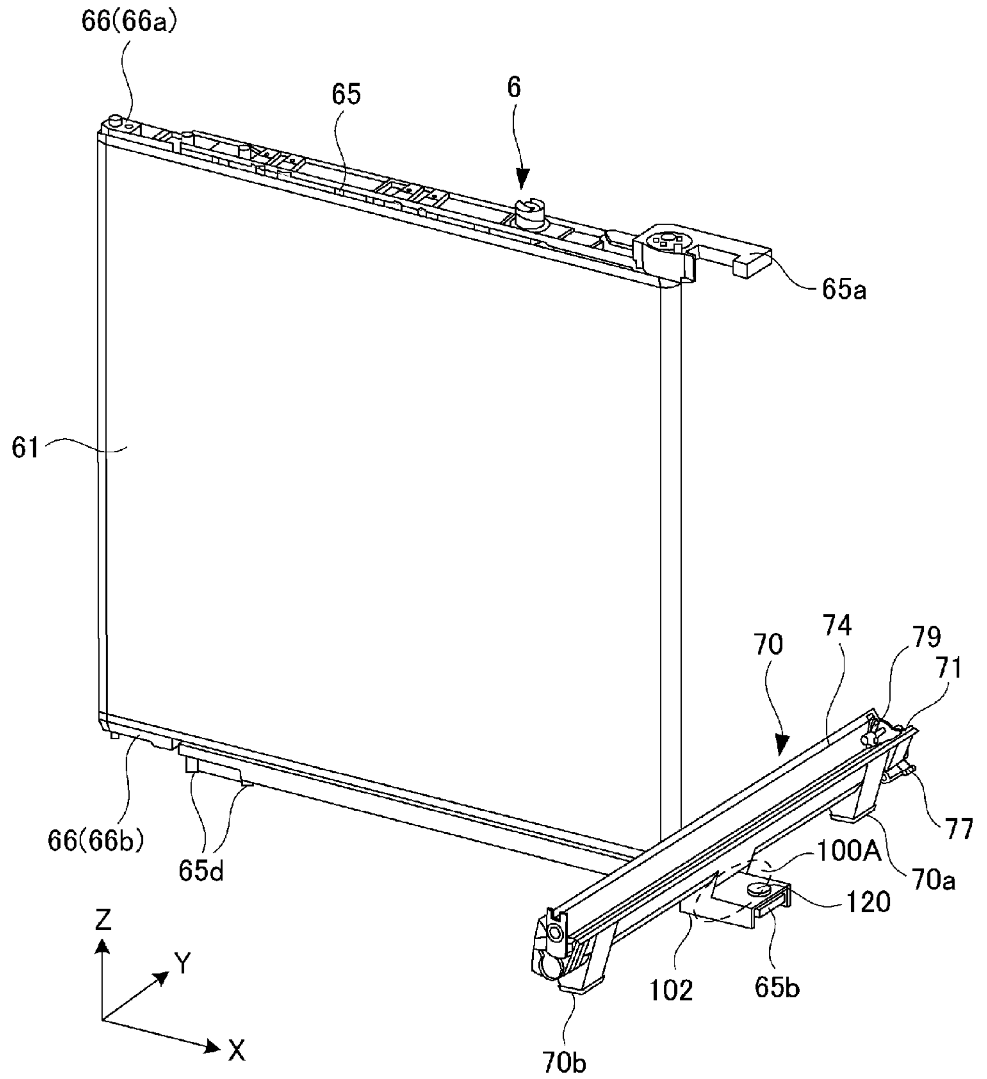

FIG. 23 is an illustration of a connecting portion in Embodiment 4.

Figure 24:
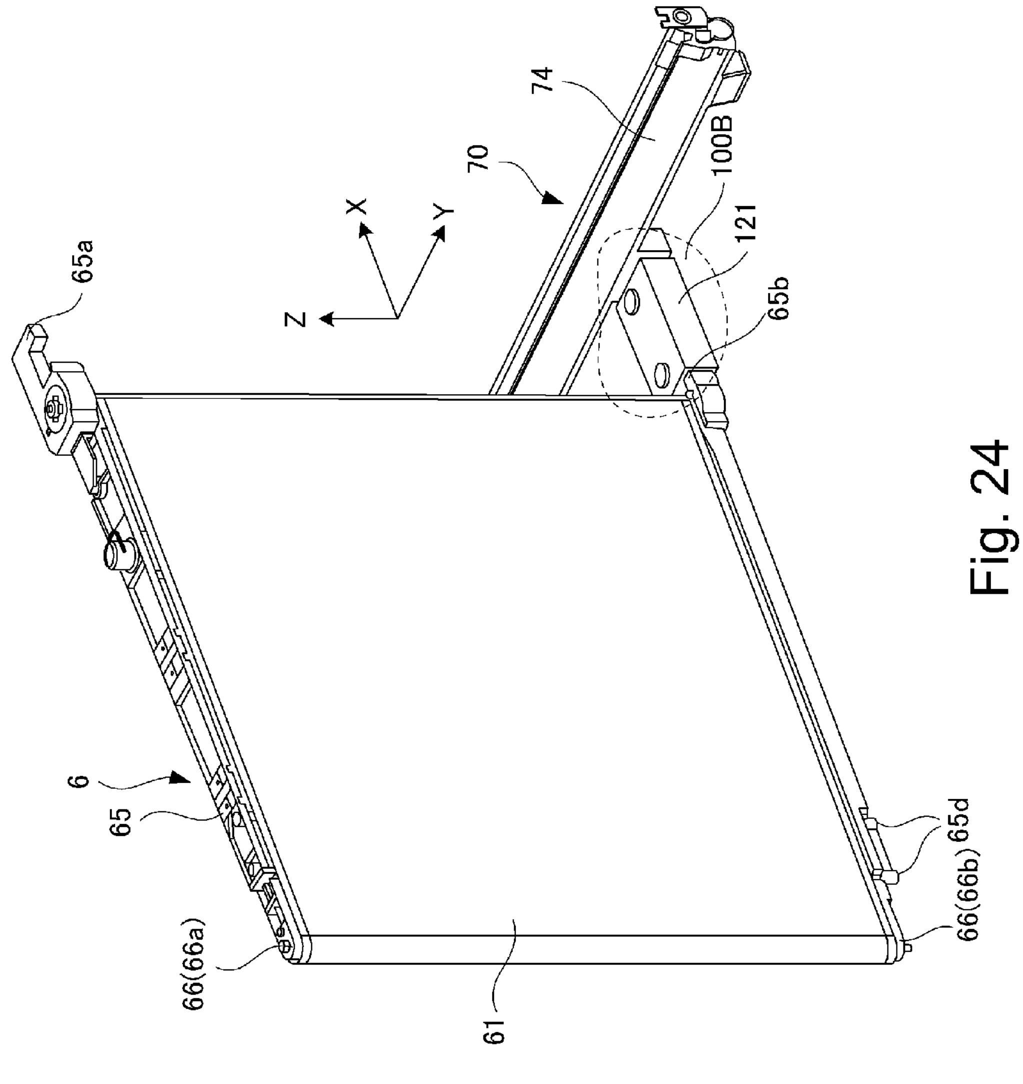

FIG. 24 is an illustration of a connecting portion in Embodiment 5.

DESCRIPTION OF THE EMBODIMENTS

Embodiments of the present invention will be described specifically with reference to the drawings.

Embodiment 1

(Image Forming Apparatus)

Figure 1:
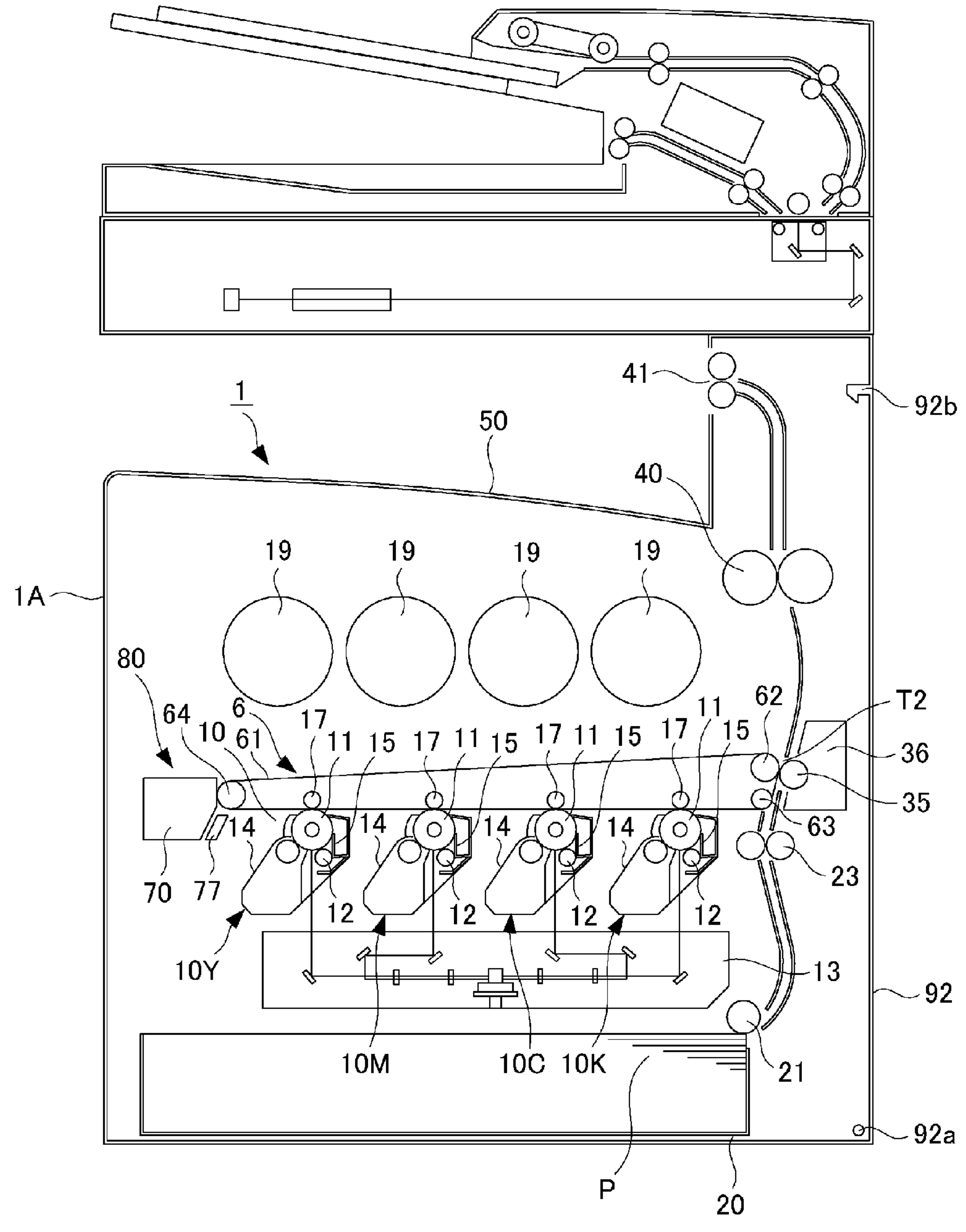
FIG. 1 is an illustration of a general structure of an image forming apparatus.

FIG. 1 is an illustration of a general structure of an image forming apparatus 1. As shown in FIG. 1, the image forming apparatus 1 is an intermediary transfer type full color printer of a tandem type in which image forming portions 10Y, 10M, 10C and 10K for yellow, magenta, cyan and black, respectively, are arranged along an intermediary transfer belt 61.

At the image forming portion 10Y, a yellow toner image is formed on a photosensitive drum 11(Y) and then is transferred onto the intermediary transfer belt 61. At the image forming portion 10M, a magenta toner image is formed on a photosensitive drum 11(M) and then is transferred onto the intermediary transfer belt 61. At the image forming portions 10C and 10K, cyan and black toner images are formed on photosensitive drums 11(C) and 11(K), respectively, and then are transferred onto the intermediary transfer belt 61.

A recording material P is pulled from a recording material cassette 20 and then is separated one by one by a separating roller 21. Then, the recording material P is in a stand-by state at a registration roller pair 23, and then is sent into a secondary transfer portion T2 by the registration roller pair 23. The four color toner images transferred on the intermediary transfer belt 61 are transferred onto the recording material P conveyed through the secondary transfer portion T2. The recording material P on which the toner images are transferred is pressed and heated by a fixing device 40, and then is, after being subjected to fixing of the toner images thereon, discharged onto a tray 50 by a discharging roller pair 41.

(Image Forming Portion)

The image forming portions 10Y, 10M, 10C and 10K have the same constitution except that colors of toners used in developing devices are different from each other. In the following, the image forming portion 10Y is described, and redundant explanation about the image forming portions 10M, 10C and 10K will be omitted.

The image forming portion 10Y includes, at a periphery of the photosensitive drum 11, a charging roller 12, an exposure device 13, a developing device 14, a primary transfer roller 17 and drum cleaning device 15. The photosensitive drum 11 includes an OPC photosensitive layer. The charging roller 12 electrically charges a surface of the photosensitive drum 11 to a negative potential uniformly. The exposure device 13 scans the surface of the photosensitive drum 11 with a laser beam through a rotating mirror, so that an electrostatic image is written (formed) on the photosensitive drum 11. The developing device 14 develops the electrostatic image with a two-component developer, so that the toner image is formed on the surface of the photosensitive drum 11. A toner cartridge 19 supplies the toner to the developing device 14.

The primary transfer roller 17 presses an inner surface of the intermediary transfer belt 61 to form a primary transfer portion between the photosensitive drum 11 and the intermediary transfer belt 61. By applying a positive DC voltage to the primary transfer roller 17, the toner image on the photosensitive drum 11 is primary-transferred onto the intermediary transfer belt 61.

The drum cleaning device 15 rubs the photosensitive drum 11 with a cleaning blade to collect a transfer residual toner remaining on the photosensitive drum 11 without being transferred onto the intermediary transfer belt 61. A belt cleaning device 70 rubs the intermediary transfer belt 61 with a cleaning blade 71 (FIG. 6) to collect a transfer residual toner from the intermediary transfer belt 61 having passed through the secondary transfer portion T2.

(Mounting and Demounting of Intermediary Transfer Unit)

Parts (a) and (b) of FIG. 2 are sectional views for illustrating mounting and demounting of an intermediary transfer unit with respect to the image forming apparatus.

As shown in FIG. 1, an intermediary transfer unit 80 is mounted detachably by being pulled out from a casing 1A of the image forming apparatus 1 in a right direction. At a right side surface of the image forming apparatus 1, an openable door 92 capable of opening the casing 1A rightward is provided. The openable door 92 is shaft-supported by a lower-side rotation shaft 92*a* and is locked to the image forming apparatus 1 by an upper-side door-locking portion 92*b*.

As shown in (a) of FIG. 2, when lock of the door-locking portion 92*b* is released and then the openable door 92 is rotated about the rotation shaft 92*a*, the openable door 92 is opened. As shown in (b) of FIG. 2, the openable door 92 is opened and then the intermediary transfer unit 80 is pulled out in an arrow B direction, so that the intermediary transfer unit 80 can be demounted from the casing 1A of the image forming apparatus 1.

(Intermediary Transfer Unit)

FIG. 3 is an illustration of a structure of the intermediary transfer unit. Parts (a) and (b) of FIG. 4 are schematic views for illustrating connection between a belt rotating unit and a cleaning unit, wherein (a) shows a front side and (b) shows a rear side.

As shown in FIG. 3, the intermediary transfer belt 80 is an exchanging unit prepared by integrally connecting a belt rotating unit 6 and a cleaning unit 70. Grip portions 65*a* and 65*b* are gripped in the fingers to pull out the intermediary transfer unit 80 in the arrow B direction, so that the intermediary transfer unit 80 is demounted from the image forming apparatus 1 as shown in (b) of FIG. 2.

As shown in (a) of FIG. 4, in the rear side of the intermediary transfer unit 80, a tension roller bearing 66 (66*a*) of the belt rotating unit 6 and a collected toner accommodating portion 74 of the cleaning unit 7 are engaged by developing portions 83 and then are fixed with a screw 82. The screw 82 is disconnected and then the cleaning unit 70 is slid toward the rear side with respect to a rotational axis direction, so that engagement of the positioning portions 83 is eliminated to separate the cleaning unit 70 from the belt rotating unit 6.

As shown in (b) of FIG. 4, in the front side of the intermediary transfer unit 80, a tension roller bearing 66 (66*b*) of the belt rotating unit 6 and the collected toner accommodating portion 74 of the cleaning unit 7 are fastened by screws 82 via a fastening member 81. The screws 82 are disconnected and then the fastening member 81 is removed, so that the cleaning unit 70 can be moved toward the rear side with respect to the rotational axis direction.

(Belt Rotating Unit)

FIG. 5 is a perspective view of the belt rotating unit in a state in which the intermediary transfer belt 61 is removed.

As shown in FIG. 1, in the belt rotating unit 6, the intermediary transfer belt 61 is stretched by the four primary transfer rollers 17, a driving roller 62, a follower roller 63 and a tension roller 64. A rotational driving force is transmitted from the driving roller 62 to the intermediary transfer belt 61.

The intermediary transfer belt 71 is formed with a polyether ether ketone (PEEK) resin material in view of resistance to fatigue from flexing.

As shown in FIG. 5, a transfer frame 65 constitutes a framework for supporting a whole of the belt rotating unit 6. At a longitudinal end portion of the transfer frame 65, the grip portions 65*a* and 65*b* for pulling out the belt rotating unit 6 (intermediary transfer unit 80) from the image forming apparatus 1 (FIG. 1) are disposed.

At end portions of each of the four primary transfer rollers 17, the driving roller 62 and the follower roller 63, these rollers are rotatably supported via bearings by side members provided in front and rear sides of the transfer frame 65. The tension roller 64 is rotatably supported at end portions thereof via bearings by tension roller bearing members 66 (66*a*, 66*b*). The tension roller 64 is urged at the end portions thereof toward a longitudinal outside thereof by a tension spring 67 provided on the transfer frame 65 as a bearing surface.

The primary transfer roller 17 is prepared by coating an electroconductive elastic layer on a surface of a shaft formed of metal (e.g., stainless steel) in a diameter of 8 mm. The electroconductive elastic layer uniformly applies a high voltage to the intermediary transfer belt 61 sandwiched between itself and the photosensitive drum 11 (FIG. 1). As a material for the electroconductive elastic layer, it is possible to use EPDM (ethylene-propylene copolymer rubber), foamed urethane, and the like.

(Cleaning Unit)

FIG. 6 is an illustration of a cross-sectional structure of the cleaning unit. FIG. 7 is a perspective view of the cleaning unit as seen from above. FIG. 8 is a perspective view of the cleaning unit as seen from below.

As shown in FIG. 6, the cleaning unit 70 rubs the intermediary transfer belt 61 with the cleaning blade 71 to remove and collect, in the collected toner accommodating portion 74, the transfer residual toner remaining on the intermediary transfer belt 61. The cleaning blade 71 is formed in a thickness of 2 mm by an urethane rubber having an Asker hardness of 70 degrees according to JIS. The collected toner accommodating portion 74 is formed with a rigid resin member.

The cleaning blade 71 is supported by a metal plate portion 72. A fixing shaft 79 rotatably mounts the metal plate portion 72 to the collected toner accommodating portion 74. A spring 707 pressed a pressing bearing surface member 72*a* fixed to the metal plate portion 72, thus elastically urge the cleaning blade 71 toward the intermediary transfer belt 61.

As shown in FIG. 7, a collected toner feeding screw 75 is rotationally supported by the collected toner accommodating portion 74. A gear 76 receives a driving force from a gear fixed to the tension roller 64 of the belt rotating unit 6, thus rotationally driving the collected toner feeding screw 75.

As shown in FIG. 8, a collected toner discharging port 71 delivers the collected toner, fed by the collected toner feeding screw 75, to a collected toner passage formed in the main assembly of the image forming apparatus 1 (FIG. 1). A shutter 78 is urged by an unshown spring in a direction in which the collected toner discharging port 77 is blocked. When the intermediary transfer unit 80 is demounted from the image forming apparatus 1 (FIG. 1), the shutter 78 automatically blocks the collected toner discharging port 77 to prevent the collected toner from leaking out of the cleaning unit 70.

(Problem of Operativity)

With respect to the image forming apparatus 1, the intermediary transfer belt 80 which has already been used can also be collectively exchanged (replaced) with a new one. However, in recent years, there is an increasing need to re-use the transfer frame 65 and the rollers of the belt rotating unit 6 by exchanging only the intermediary transfer belt 61 of an expensive intermediary transfer unit 80.

When the intermediary transfer belt 61 is demounted from and mounted to the intermediary transfer unit 80, in order to prevent the intermediary transfer belt 61 and another member from generating scars or a dent, there is a need to carefully operate (handle) the intermediary transfer belt 61 with hands of an operator. For that reason, in a conventional constitution, a dedicated tool or an auxiliary stand jig was prepared for ensuring operativity, and the belt rotating unit 6 was held to stand vertically.

Further, the operator is required to stand the cleaning unit 70 in an unused work space in a state in which a toner opening is directed upward in order to prevent the collected toner, collected in the cleaning unit 70 demounted from the belt rotating unit 6, from scattering over the outside.

However, during the exchanging position of the intermediary transfer belt 61, there was the case where the operator accidentally touches the cleaning unit 70 to cause the cleaning unit 70 to fall down to scatter the collected toner over a floor.

Therefore, in Embodiment 1, a constitution in which the belt rotating unit 6 and the cleaning unit 70 was connected with each other in a T-character shape to stand at the same was employed.

Characteristic Portion of Embodiment 1

As shown in FIG. 1, the plurality of image forming portions 10Y, 10M, 10C and 10K are arranged and disposed in a conveyance direction of the intermediary transfer belt 61 as an example of the belt member, and the photosensitive drum 17 as an example of an individual image bearing member, the toner image is formed and then is transferable onto the intermediary transfer belt member. The intermediary transfer unit 80 as an example of the belt unit is demountable from the casing 1A by being moved in an arrangement direction of the plurality of image forming portions 10Y, 10M, 10C and 10K.

In the belt rotating unit 6, the intermediary transfer belt 61 as the example of the belt member is stretched by, as examples of a plurality of rotatable supporting members, the four primary transfer rollers 17, the driving roller 62, the follower roller 63 and the tension roller 64. The cleaning unit 70 is assembled demountably from the belt rotating unit 6 to collect the toner from the intermediary transfer belt 61 in a rotation state.

As shown in FIG. 5, the grip portion 65*a* as an example of a grip portion is disposed at a longitudinal end portion of a side member 65F, and is used when the intermediary transfer unit 80 is pulled out from the image forming apparatus 1. The primary transfer rollers 17, the driving roller 62, the follower roller 63 and the tension roller 64 are supported by a pair of side members 65F and 65R.

As shown in FIG. 9, a connecting portion 100 as an example of a connecting means is capable of connecting the cleaning unit 70, demounted from the belt rotating unit 6, to the side member 65F by positioning the cleaning unit 70 with respect to a direction crossing the longitudinal direction of the side member 65F. With respect to the intermediary transfer unit 80, in a state in which the side member 65F and the cleaning unit 70 which are connected with each other are directed downward and the other side member 65R is directed upward, the belt rotating unit 6 can be held in a standing state.

As shown in FIG. 20, in the standing state, the side member 65R positioned in an upper side of the belt rotating unit 6 is constituted so that the intermediary transfer belt 61 is capable of being pulled out upward. The side member 65F positioned in a lower side of the belt rotating unit 6 has a bearing surface 65*d* as an example of a projected portion, for landing, projected in the rotation axis direction of the primary transfer roller 17. The cleaning unit 70 includes bearing surfaces 70*a* and 70*b*, as an example of a projected portion capable of landing, provided at end portions in a side opposite from a side where the cleaning unit 70 opposes the intermediary transfer belt 61 in a state in which the cleaning unit 70 is assembled with the belt rotating unit 6 to collect the toner.

The connecting portion 100 connects the side member 65F to the cleaning unit 70 in a position outside the intermediary transfer belt 61 with respect to the conveyance direction of the intermediary transfer belt 61. As a result, the intermediary transfer belt 61 is prevented from entering above the cleaning unit 70. The connecting portion 100 connects the side member 65F in a position lower than a toner collecting mechanism of the cleaning unit 70 in a state in which a surface opposing the intermediary transfer belt 61 in a toner collecting state is directed upward. As a result, the belt rotating unit 6 can be compactly connected while crossing the toner collecting mechanism.

As shown in FIG. 9, the grip portion 65*b* and a positioning projection 65*e* which are examples of a plurality of projected portions are provided on the belt rotating unit 6. Holes 101*a* and 101*c* which are examples of openings are provided in the cleaning unit 70. The connecting portion 100 has a structure in which the grip portion 65*b* and the positioning projection 65*e* are inserted into the holes 101*a* and 101*c*, respectively. As a result, a load of the hole 101*a* in the case where a torsional force acts on the belt rotating unit 6 relative to the cleaning unit 70 is alleviated.

As shown in FIG. 9, the hole 101*a* as the example of the opening is provided in the cleaning unit 70 so that the grip portion 65*b* is insertable into the hole 101*a*. As shown in FIG. 10, a snap-fit portion 101*b* positions and fixes the cleaning unit 70, moved by inserting the grip portion 65*b* into the hole 101*a*, relative to the grip portion 65*b* in a predetermined position with respect to an insertion direction.

(Connecting Portion)

FIG. 9 is a perspective view of the belt rotating unit and the cleaning unit before the connection. FIG. 10 is a side view of the belt rotating unit and the cleaning unit before the connection. FIG. 11 is a perspective view of the belt rotating unit and the cleaning unit after the connection. FIG. 12 is a side view of the belt rotating unit and the cleaning unit after the connection.

As shown in FIG. 9, in order to connect the belt rotating unit 6 and the cleaning unit 70, the belt rotating unit 6 uses the grip portion 65*b* and the positioning projection 65*e* which are formed on the transfer frame 65. The cleaning unit 70 is provided with the holes 101*a* and 101*c*, a longitudinal central portion of the collected toner accommodating portion 74. The grip portion 65*b* of the belt rotating unit 6 is inserted into the hole 101*a* of the cleaning unit 70. The positioning projection 65*e* of the belt rotating unit 6 is inserted into the hole 101*c* of the cleaning unit 70. As shown in FIG. 11, when the belt rotating unit 6 and the cleaning unit 70 are connected, the grip portion 65*b* and the positioning projection 65*e* are engaged into the holes 101*a* and 101*c*, respectively, so that positioning and fixing between the belt rotating unit 6 and the cleaning unit 70 with respect to Y direction and Z direction are realized. The positioning projection 65*e* takes charge of positioning a rotation center of the cleaning unit 70 in a YZ plane, and the grip portion 65*b* takes change of limiting tilting of the cleaning unit 70 in the YZ plane.

As shown in FIG. 10, the grip portion 65*b* of the belt rotating unit 6 is provided with a hole 65*g*. The cleaning unit 70 is provided with the snap-fit portion 101*b* for being engaged with the hole 65*g*. As shown in FIG. 12, when the belt rotating unit 6 and the cleaning unit 70 are connected with each other, the snap-fit portion 101*b* is engaged in the hole 65*g*, so that the positioning and fixing between the belt rotating unit 6 and the cleaning unit 70 with respect to the insertion direction (X direction). For this reason, through an exchanging operation procedure of the intermediary transfer belt 61, there is no fear that the connection between the belt rotating unit 6 and the cleaning unit 70 is eliminated (released).

As shown in FIG. 11, in the state in which the belt rotating unit 6 and the cleaning unit 70 are connected with each other, a surface 65*k* of the transfer frame 65 and a surface 70*k* of the cleaning unit 70 abut against each other to limit further movement in the insertion direction (X direction). For this reason, through the exchanging operation procedure of the intermediary transfer belt 61, there is no fear that the intermediary transfer belt 61 contacts the cleaning unit 70 to be damaged.

Incidentally, the positioning projection 65*e* of the transfer frame 65 is not a dedicated structure for the connection but is a structure for positioning a secondary transfer unit 36 including a secondary transfer outer roller 35 provided in the right-side door unit 92 shown in FIG. 1. The secondary transfer unit 36 is mounted to the right-side door unit 92 so as to be translatable and rotationally movable by an unshown spring in a plane including the secondary transfer portion T2. The positioning projection 65*e* is engaged in an unshown opening provided in a side of the opposing secondary transfer unit 36, thus positioning the driving roller 62 and the secondary transfer outer roller 35 in parallel.

In Embodiment 1, at the connecting portion 100 between the belt rotating unit 6 and the cleaning unit 70, the cleaning unit 70 is provided with the snap-fit portion 101*b*, and therefore there is no need to provide a dedicated connecting member such as a screw. Accordingly, a connecting structure can be simply constituted without being complicated.

In this embodiment, the structure for the connection in the belt rotating unit 6 side includes the positioning projection 65*e* and the grip portion 65*b* which have already been provided, and therefore, there is no need to provide a dedicated connecting structure. For that reason, it is possible to realize a whole structure of the belt rotating unit in a small and compact manner.

(Self-Standing State)

FIG. 13 is a perspective view of the belt rotating unit and the cleaning unit after the connection as seen at a different angle. FIG. 14 is a front view of the belt rotating unit and the cleaning unit after the connection. FIG. 15 is an illustration of a tilt angle of the belt rotating unit.

As shown in FIG. 5, the side member of the transfer frame 65 in the front side is provided with the bearing surface 65*d* which lands when the belt rotating unit 6 is placed in a standing state. The bearing surface 65*d* is disposed with respect to a direction opposite to a pulling-out direction of the intermediary transfer belt 61. As shown in FIG. 8, the cleaning unit 70 is provided with the bearing surfaces 70*a* and 70*b* at longitudinal end portions, and is provided with a connecting portion bearing surface 102 at a longitudinal central portion.

As shown in FIG. 13, the connecting portion 100 connects the belt rotating unit 6 and the cleaning unit 70 outside the image forming apparatus 1 (FIG. 1). By the connection, simultaneously with self-standing of the belt rotating unit 6 in the vertical direction, an opening through which the collected toner is accommodated in the cleaning unit 70 is held upward with respect to the vertical direction, so that the cleaning unit 70 stands by itself so that the collected toner is not leaked out to the outside thereof.

In this embodiment, in the self-standing state, the opening through which the collected toner is accommodated in the cleaning unit 70 is positioned at an end of the cleaning blade 71, and therefore the operator can also check a damage state of the end of the cleaning blade 71.

As shown in FIG. 12, in the self-standing state of the belt rotating unit 6 and the cleaning unit 70 connected by the connecting portion 100, the bearing surface 65*d* formed on the transfer frame 65 in the belt rotating unit 6 side and the connecting portion bearing surface 102 of the cleaning unit 70 land. The connecting portion bearing surface 102 and the bearing surface 65*d* establish a substantially horizontal positional relationship with respect to the Z direction.

As a result, the belt rotating unit 6 and the cleaning unit 70 which are connected with each other can be kept in a stable state as seen in an XZ plane. Accordingly, the cleaning unit 70 is supported with respect to a falling direction (in which the cleaning unit 70 is rotated in the XZ plane), so that the self-standing state of the cleaning unit 70 can be maintained.

As shown in FIG. 14, the cleaning unit 70 includes the bearing surfaces 70*a* and 70*b* at the longitudinal end portions. When the belt rotating unit 6 and the cleaning unit 70 which are connected with each other are stood so that the belt rotating unit 6 is parallel to a Z axis, the bearing surfaces 70*a* and 70*b* are kept in a slightly floating state from an installation surface relative to the connecting portion bearing surface 102. As a result, the belt rotating unit 6 can be obliquely supported when the belt rotating unit 6 is viewed from the YZ plane by the operator.

As shown in FIG. 15, the belt rotating unit 6 and the cleaning unit 70 which are placed in a connected state can be tilted by an angle θ in the YZ plane. For example, in FIG. 15, when these units are tilted in a clockwise direction, the belt rotating unit 6 is rotated in an arrow D direction with the connecting portion bearing surface 102 as a supporting point, so that the bearing surface 70*a* lands. A tilt angle at this time is the angle θ.

In a state in which the belt rotating unit 6 is tilted by the angle θ in the clockwise direction, rotation movement M, about the bearing surface 70*a*, generated by a force F exerted on a position G of gravitation is always generated with respect to a counterclockwise direction and thus acts in a direction in which the cleaning unit 70 is not caused to fall down. In this way, the position of the bearing surface 70*a* is designed. Also the case where the belt rotating unit 6 is tilted toward the bearing surface 70*b* side in the counterclockwise direction is similar to the above case.

On the other hand, in the case where the position of the bearing surface 70*a* is close to the connecting portion bearing surface 102 and in the case where the position of the bearing surface 70*a* is designed as a position considerably higher than the connecting portion bearing surface 102, a tiltable angle θ becomes large. In this case, when the belt rotating unit 6 is largely tilted until the rotation M acts clockwise, the belt rotating unit 6 is rotated about the bearing surface 70*a* to fall down.

In this way, by tilting the belt rotating unit 6 in a direction (arrow D direction) of the operator himself (herself), the intermediary transfer belt 61 can be pulled out toward the direction of the operator. It becomes also possible to tilt the belt rotating unit 6 in both of left and right directions. For this reason, even when the operator is positioned in either side, exchanging operativity becomes easy.

(Exchange Constitution of Intermediary Transfer Belt)

FIG. 16 is a perspective view of the belt rotating unit and the cleaning unit during exchange of the intermediary transfer belt. Parts (a), (b) and (c) of FIG. 17 are illustrations of demounting of a tension roller bearing. Parts (a) and (b) of FIG. 18 are illustrations of a tension releasing operation of a tension roller. FIG. 19 is an illustration of a tension roller demounting position. FIG. 20 is an illustration of a pulling-out operation of the intermediary transfer belt.

As shown in FIG. 5, in order to pull out the intermediary transfer belt 61 (FIG. 3) from the belt rotating unit 6 toward the rear side, there is a need to not only remove an obstacle (interference member) from a pulling-out passage of the intermediary transfer belt 61 (FIG. 3) but also release tension pressure of the tension spring 67. The obstacle includes the rear-side grip portion 65*a* and the rear-side tension roller bearing 66*a*.

The front-side grip portion 65*b* is integrally formed with the transfer frame 65 but the rear-side grip portion 65*a* is detachably mountable to the transfer frame 65. For that reason, in a state in which the transfer frame 65 is directed downward in the front side to stand the belt rotating unit 6 (vertical disposition), the upper grip portion 65*a* is demounted from the rear side of the transfer frame 65, so that it becomes possible to pull out the intermediary transfer belt 61 in a rear side direction of the transfer frame 65.

As shown in FIG. 16, the belt rotating unit 6 and the cleaning unit 70 are connected to stand. The upper grip portion 65*a* is disconnected from the transfer frame 65 by disconnecting a lock portion 65*r*.

As shown in (a) of FIG. 17, the tension roller bearing 66*a* is supported by a guide portion 65*p* of the transfer frame 65. As shown in (b) of FIG. 17, when the tension roller bearing 66*a* is moved in an arrow D direction opposite to a direction in which tension is applied, the tension roller bearing 66*a* is disconnected from the guide portion 65*p* of the transfer frame 65. As a result, as shown in (c) of FIG. 17, the tension roller bearing 66*a* is demountable in an arrow E direction. The tension spring 67 is lightly press-fitted into the tension roller bearing 66*a*, and therefore also the tension spring 67 is disconnected simultaneously with the demounting of the tension roller bearing 66*a*.

As shown in (b) of FIG. 18, tension pressure applied to the lower tension roller bearing 66*b* in the self-standing state is released in a state in which the tension roller bearing 66*b* is still mounted to the transfer frame 65. As shown in (b) of FIG. 18, when the tension roller bearing 66*b* is moved in an arrow S side, the tension roller bearing 66*b* is locked at a lock portion 65*s* of the transfer frame 65 by a snap-fit portion 66*s* in a state in which the tension spring 67 is compressed. As a result, the intermediary transfer belt 61 is placed in a pressure-released state.

As shown in FIG. 19, before demounting the intermediary transfer belt 61, the tension roller 64 is pulled out from above. This is because in the case where only the tension pressure of the tension roller bearing 66*b* is released by disconnecting the grip portion 65*a* and the tension roller bearing 66*b*, at the instant when the intermediary transfer belt 61 is pulled out upward, the tension roller 64 which has lost its support falls down.

As shown in FIG. 20, the intermediary transfer belt 61 is then moved upward to be pulled out from the belt rotating unit 6.

According to Embodiment 1, when the intermediary transfer belt 61 is exchanged, the operator can use both hands throughout the operation, so that the operator can carefully perform the exchange of the intermediary transfer belt 61 from the belt rotating unit with both hands.

According to this embodiment, the belt rotating unit 6 and the cleaning unit 70 can be held in the standing state by being connected with each other, and therefore the belt rotating unit 6 can be kept in the self-standing state without using a dedicated tool or part.

According to this embodiment, a single serviceperson can perform the exchanging operation with both hands with no fear that the cleaning unit 70 containing the collected toner falls down, and therefore the exchanging operativity is improved. Accordingly, a service cost can be reduced.

Embodiment 2

In Embodiment 2, an exchanging procedure of the intermediary transfer belt 61 in the intermediary transfer unit 80 in Embodiment 1 will be described.

(1) As shown in FIG. 2, the intermediary transfer unit 80 is demounted from the image forming apparatus 1. Then, as shown in FIG. 3, the intermediary transfer unit 80 is mounted on a work-bench (working table).

(2) As shown in FIG. 4, the fastening member 81 is demounted, and then the cleaning unit 70 is separated from the belt rotating unit 6.

(3) As shown in FIG. 9, the belt rotating unit 6 is stood, and then is connected with the cleaning unit 70 by the connecting portion 100. Thus, as shown in FIG. 13, after the connection, the belt rotating unit 6 and the cleaning unit 70 self-stand even when the operator removes the both hands from these units.

(4) As shown in FIG. 16, the grip portion 65*a* and the tension roller bearing 66*a* are demounted form the transfer frame 65.

(5) As shown in FIG. 18, the lower tension roller bearing 66*b* is locked to place the intermediary transfer belt 61 in the pressure-released state.

(6) As shown in FIG. 19, the tension roller 64 is demounted.

(7) As shown in FIG. 20, the intermediary transfer belt 61 is demounted from the belt rotating unit 6.

Thereafter, a new intermediary transfer belt 61 is inserted into the belt rotating unit 6 and then is assembled as it was.

(1) As shown in FIG. 20, the new intermediary transfer belt 61 is inserted into the belt rotating unit 6.

(2) As shown in FIG. 19, the tension roller 64 is mounted.

(3) As shown in FIG. 18, the lock of the lower tension roller bearing 66*b* is released to restore the intermediary transfer belt 61 to the pressed state.

(4) As shown in FIG. 16, the grip portion 65*a* and the tension roller bearing 66*a* are mounted to the transfer frame 65.

(5) As shown in FIG. 9, the belt rotating unit 6 is pulled out from the cleaning unit 70 to eliminate (remove) the connection between the belt rotating unit 6 and the cleaning unit 70 by the connecting portion 100.

(6) As shown in FIG. 4, the cleaning unit 70 is positioned at the end portion of the belt rotating unit 6 and then the fastening member 81 is attached, thus being assembled into the intermediary transfer unit 80.

(7) As shown in FIG. 2, the intermediary transfer unit 80 is inserted into the image forming apparatus 1.

Embodiment 3

FIG. 21 is an illustration of a disconnecting operation of the cleaning blade. FIG. 22 is an illustration of a demounting operation of the cleaning blade.

In Embodiment 3, an exchanging procedure of the cleaning blade 71 in the intermediary transfer unit 80 in Embodiment 1 will be described.

(1) As shown in FIG. 2, the intermediary transfer unit 80 is demounted from the image forming apparatus 1. Then, as shown in FIG. 3, the intermediary transfer unit 80 is mounted on a work-bench (working table).

(2) As shown in FIG. 4, the fastening member 81 is demounted, and then the cleaning unit 70 is separated from the belt rotating unit 6.

(3) As shown in FIG. 9, the belt rotating unit 6 is stood, and then is connected with the cleaning unit 70 by the connecting portion 100. Thus, as shown in FIG. 13, after the connection, the belt rotating unit 6 and the cleaning unit 70 self-stand even when the operator removes the both hands from these units.

As shown in FIG. 13, in a state in which the belt rotating unit 6 and the cleaning unit 70 are connected with each other to self-stand, the cleaning blade 71 of the cleaning unit 70 is exchanged.

Before exchanging the cleaning blade 71 from the cleaning unit 70, in order to prevent the collected toner from scattering over the outside, the cleaning blade 71 and the neighborhood thereof are wiped with a non-woven fabric to clean the cleaning blade 71.

As shown in FIG. 21, the fixing shaft 79 rotatably supporting the metal plate portion 72 of the cleaning blade 71 is demounted from the collected toner accommodating portion 74. Thus, as shown in FIG. 6, by demounting the fixing shaft 79, a cleaning blade unit into which the cleaning blade 71 and the metal plate portion 72 are integrally assembled is separable from the collected toner accommodating portion 74.

As shown in FIG. 22, the operator demounts the cleaning blade 71 and the metal plate portion 72, as a unit, from the cleaning unit 70. Thereafter, the operator demounts the old cleaning blade 71 from the metal plate portion 72 and then mounts a new cleaning blade 71 to the metal plate portion 72. After the exchange of the cleaning blade 71, the operator mounts the new cleaning blade 71 and the metal plate portion 72, as a unit, to the cleaning unit 70.

As shown in FIG. 21, the fixing shaft 79 is mounted to the collected toner accommodating portion 74. As shown in FIG. 6, when the fixing shaft 79 is mounted, the metal plate portion 72 of the cleaning blade 71 is rotatably supported by the collected toner accommodating portion 74. In this state, a lubricant is applied onto the cleaning blade 71.

(1) As shown in FIG. 9, the belt rotating unit 6 is pulled out from the cleaning unit 70 to eliminate (remove) the connection between the belt rotating unit 6 and the cleaning unit 70 by the connecting portion 100.

(2) As shown in FIG. 4, the cleaning unit 70 is positioned at the end portion of the belt rotating unit 6 and then the fastening member 81 is attached, thus being assembled into the intermediary transfer unit 80.

(3) As shown in FIG. 2, the intermediary transfer unit 80 is inserted into the image forming apparatus 1.

According to Embodiment 3, the operator can perform the exchanging operation easily with both hands throughout the operation without causing the falling-down of the cleaning unit 70 in which the collected toner is accommodated.

Embodiments 4 and 5

FIG. 23 is an illustration of a connecting portion in Embodiment 4. FIG. 24 is an illustration of a connecting portion in Embodiment 5. Embodiments 4 and 5 are different from Embodiment 1 only in constitution of the connecting portion, and other constitutions thereof are the same as those in Embodiment 1. Therefore, redundant description about constituent elements (portions) other than the connecting portion will be omitted.

As shown in FIG. 23, a connecting portion 100A in Embodiment 4 connects the belt rotating unit 6 and the cleaning unit 70 by being fastened with a dedicated screw 120.

As shown in FIG. 24, a connecting portion 100B in Embodiment 5 connects the belt rotating unit 6 and the cleaning unit 70 by including a dedicated connecting part 121.

The above-described embodiments can also be carried out in the embodiments in which a part or all of constituent elements are replaced with their alternative constituent elements so long as the belt rotating unit is caused to self-stand by being connected with the cleaning unit.

Therefore, the belt member is not limited to the intermediary transfer belt but may also be a recording material conveying belt, a transfer belt and the like. The present invention can be carried out irrespective of one drum type/tandem type and intermediary transfer type/recording material conveying member type if the image forming apparatus is an image forming apparatus using the belt member. The present invention can also be carried out irrespective of the number of the image bearing members, a charging type of the image bearing members, a type of formation of the electrostatic image, the developer and a developing type, a transfer type, and the like.

Further, in the above-described embodiments, only a principal portion relating to formation/transfer of the toner image was described, but by adding necessary devices, equipment and casing structures and the like, the present invention can be carried out in image forming apparatuses of various uses, such as printers, various printing machines, copying machines, facsimile machines, and multi-function machines.

In the belt unit in the present invention, the cleaning unit demounted from the belt unit is connected with the belt rotating unit by the connecting means, so that the belt rotating unit is kept in the standing state. Therefore, without preparing the dedicated jig, the belt rotating unit of the belt unit is stably held in the standing state, so that the operativity of the exchange of the belt member can be enhanced.

While the invention has been described with reference to the structures disclosed herein, it is not confined to the details set forth and this application is intended to cover such modifications or changes as may come within the purpose of the improvements or the scope of the following claims.

This application claims priority from Japanese Patent Application No. 281067/2012 filed Dec. 25, 2012, which is hereby incorporated by reference.

What is claimed is:

1. A belt unit for use with an image forming apparatus, comprising:

a belt member;

a belt supporting unit including a plurality of supporting rollers, a pair of side units, attaching portions, and a connected portion, wherein the plurality of supporting rollers are configured to support said belt member, the pair of side units are configured to support end portions of each of the plurality of supporting rollers, the attaching portions are provided proximate to positions where the pair of side units support the end portions of one of the supporting rollers, and the connected portion is provided at an end of one of the side units; and a cleaning unit, attached to said belt supporting unit in an attached position, configured to clean a deposited matter on said belt member, said cleaning unit including attached portions, a connecting portion, and a contact portion, wherein the attached portions are provided at longitudinal end portions, respectively, of said cleaning unit and are engaged with the attaching portions, respectively, to mount said cleaning unit in the attached position, the connecting portion is provided in a position different from each of the attached portions and proximate to a longitudinal central portion of said cleaning unit and is connectable with the connected portion, and the contact portion is provided on an outer surface of said cleaning unit and contacts a horizontal surface when said cleaning unit is placed on the horizontal surface so that a longitudinal direction of said cleaning unit is directed in a horizontal direction, and wherein, when said belt supporting unit is in a standing state in which one of the side units is directed downward and a direction of rotation axis of the supporting rollers is directed in a vertical direction, said cleaning unit is placed on the horizontal surface in a state in which the contact portion contacts the horizontal surface, and the connected portion and the connecting portion are connected, said cleaning unit maintains said belt supporting unit in the standing state.

2. A belt unit according to claim 1, wherein at least a part of the other side unit is demountable from said belt supporting unit so as to make said belt member replaceable in the standing state.

3. A belt unit according to claim 1, wherein one of the side units includes a projected portion, for landing, projected in the vertical direction in the standing state, and wherein the contact portion includes a projected portion, for landing, provided at a portion opposite from a side where said cleaning unit is in the attached position.

4. A belt unit according to claim 1, wherein when said belt supporting unit is in the standing state, the connecting portion and the connected portion are connected to each other at a portion outside a region of said belt member when being projected onto a flat plane perpendicular to the rotation axis of one of the supporting rollers.

5. A belt unit according to claim 1, wherein each of the side units includes a grip portion, positioned at an end portion of said belt unit, for being used when said belt unit is pulled out from a main assembly of an image forming apparatus, and wherein the grip portion of one of the side units is insertable into an opening as the connecting portion of said cleaning unit.

6. A belt unit according to claim 5, wherein said cleaning unit includes a retaining portion for fixing the grip portion, inserted into the opening of said cleaning unit, in a predetermined position with respect to an insertion direction of the grip portion.

7. An image forming apparatus comprising:

a main assembly;

a belt unit detachably mountable to said main assembly, including:

a belt member;

a belt supporting unit, including a plurality of supporting rollers, a pair of side units, attaching portions, and a connected portion, wherein the plurality of supporting rollers are configured to support said belt member, the pair of side units are configured to support end portions of each of the plurality of supporting rollers, the attaching portions are provided proximate to positions where the pair of side units support the end portions of one of the supporting rollers, and the connected portion is provided at an end of one of the side units; and a cleaning unit, attached to said belt supporting unit in an attached position, configured to clean a deposited matter on said belt member, said cleaning unit including attached portions, a connecting portion, and a contact portion, wherein the attached portions are provided at longitudinal end portions, respectively, of said cleaning unit and are engaged with the attaching portions, respectively, to mount said cleaning unit in the attached position, the connecting portion is provided in a position different from each of the attached portions and proximate to a longitudinal central portion of said cleaning unit and is connectable with the connected portion, and the contact portion is provided on an outer surface of said cleaning unit and contacts a horizontal surface when said cleaning unit is placed on the horizontal surface so that a longitudinal direction of said cleaning unit is directed in a horizontal direction; and a plurality of image forming portions each for transferring a toner image, formed on an image bearing member, onto said belt member, wherein said plurality of image forming portions are arranged in said main assembly so as to oppose said belt member when said belt unit is mounted in said main assembly, wherein, in a case where said belt unit is pulled out from said main assembly and said cleaning unit is demounted from said belt supporting unit when said belt supporting unit is in a standing state, one of the side units is directed downward and a direction of rotation axis of the supporting rollers is directed in a vertical direction, said cleaning unit is placed on the horizontal surface in a state in which the contact portion contacts the horizontal surface, and the connected portion and the connecting portion are connected, said cleaning unit maintains said belt supporting unit in the standing state.

8. An image forming apparatus according to claim 7, wherein the connected portion also functions as a positioning member for positioning a transfer member, for transferring the toner image from said belt member onto a recording material, relative to said belt unit.

9. A belt unit according to claim 1, wherein the contact portion is provided at a longitudinal central portion of said cleaning unit, and said cleaning unit includes side contact portions which are provided at spaced positions toward longitudinal end portions, respectively, relative to the contact portion and which are provided at spaced positions from the horizontal surface when said belt supporting unit is in the standing state.

10. A belt unit according to claim 9, wherein when said belt supporting unit is inclined so that one of the side contact portions contacts the horizontal surface, the side contact portions and the contact portion are disposed so that rotational moment for returning said belt supporting unit to the standing state is generated.

* * * * *